United States Patent
Matsui et al.

(10) Patent No.: US 10,545,333 B2
(45) Date of Patent: Jan. 28, 2020

(54) PHOTONIC CRYSTAL FIBER AND HIGH-POWER LIGHT TRANSMISSION SYSTEM

(71) Applicant: NIPPON TELEGRAPH AND TELEPHONE CORPORATION, Chiyoda-ku, Tokyo (JP)

(72) Inventors: Takashi Matsui, Tsukuba (JP); Kazuhide Nakajima, Tsukuba (JP); Kyozo Tsujikawa, Tsukuba (JP); Fumihiko Yamamoto, Tsukuba (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 15/772,263

(22) PCT Filed: Nov. 17, 2016

(86) PCT No.: PCT/JP2016/084024
§ 371 (c)(1),
(2) Date: Apr. 30, 2018

(87) PCT Pub. No.: WO2017/098878
PCT Pub. Date: Jun. 15, 2017

(65) Prior Publication Data
US 2018/0321439 A1    Nov. 8, 2018

(30) Foreign Application Priority Data
Dec. 10, 2015    (JP) ................. 2015-240984

(51) Int. Cl.
*G02B 6/032* (2006.01)
*G02B 6/02* (2006.01)
*G02B 27/00* (2006.01)

(52) U.S. Cl.
CPC ..... *G02B 27/0012* (2013.01); *G02B 6/02323* (2013.01); *G02B 6/02338* (2013.01);
(Continued)

(58) Field of Classification Search
CPC ............... G02B 27/00; G02B 6/02323; G02B 6/02338; G02B 6/02347; G02B 6/02357; G02B 6/02361; G02B 6/032
See application file for complete search history.

(56) References Cited

U.S. PATENT DOCUMENTS 8,849,083 B1    9/2014 Samson et al.
2008/0050077 A1*  2/2008 Kinoshita .......... G02B 6/02357
                                                            385/125
(Continued)

FOREIGN PATENT DOCUMENTS

JP    2010-14893 A    1/2010
JP    2010-129886 A   6/2010
(Continued)

OTHER PUBLICATIONS

Himeno, "Basics and Features of High-Power Fiber Laser", Fujikura Technical Journal, vol. 1, pp. 1-6, Jan. 2014, partial English translation.
(Continued)

*Primary Examiner* — Chris H Chu
(74) *Attorney, Agent, or Firm* — Ohlandt, Greeley, Ruggiero & Perle, L.L.P.

(57) ABSTRACT

A photonic crystal fiber according to the present invention has a plurality of holes arranged in the optical fiber along a longitudinal direction, in which the holes are arranged such that, in a cross section, a hole ratio which is an area of the holes per unit area is larger in a central side than in an outer side in a portion corresponding to a cladding and that a wide core area can be obtained while the number of modes that
(Continued)

can be propagated is limited to several. Moreover, in a high-power optical transmission system according to the present invention, the amount of axis misalignment between the central axis of a laser oscillator and the central axis of the photonic crystal fiber is less than or equal to a certain amount.

6 Claims, 23 Drawing Sheets

(52) U.S. Cl.
CPC ..... *G02B 6/02347* (2013.01); *G02B 6/02357* (2013.01); *G02B 6/02361* (2013.01); *G02B 6/032* (2013.01); *G06F 2217/16* (2013.01)

(56) References Cited

U.S. PATENT DOCUMENTS

2010/0135628 A1 6/2010 Mukasa
2012/0288247 A1 11/2012 Tanigawa et al.

FOREIGN PATENT DOCUMENTS

| JP | 2010-217472 A | 9/2010 |
|---|---|---|
| JP | 2012-168448 A | 9/2012 |
| WO | 2011093349 A1 | 8/2011 |

OTHER PUBLICATIONS

Yamasaki et al., "10 kW Long-length Cables for Laser Transmission Incorporated with Eight Optical Fibers", R & D Review of Mitsubishi Cable Industries, Ltd., No. 105, pp. 24-27, Oct. 2008, partial English translation.

Matsui et al., "Study on Enlargement of Effective Area of Photonic Crystal Fiber", The Institute of Electronics, Information and Communication Engineers, B-13-21, Sep. 2008, 1 pages, partial English translation.

G. P. Agrawal, "Nonlinear Fiber Optics", Academic Press, pp. 278-279.

Wang et al., "Bend-resistant large-mode-area photonic crystal fiber with a triangular-core", Applied Optics, Jun. 20, 2013, vol. 52, No. 18, 4323-4328.

First Japanese Office Action dated Jul. 5, 2016 from corresponding Japanese Patent Application No. JP2015-240984, 8 pages, partial English translation.

International Search Report dated Feb. 21, 2017 from corresponding International PCT Application No. PCT/JP2016/084024, 2 pages.

International Preliminary Report on Patentability dated Jun. 21, 2018 from corresponding International PCT Application PCT/JP2016/084024, 10 pages.

* cited by examiner

PHOTONIC CRYSTAL FIBER AND HIGH-POWER LIGHT TRANSMISSION SYSTEM

TECHNICAL FIELD

The present disclosure relates to a photonic crystal fiber and a high-power optical transmission system that enable high power optical transmission.

BACKGROUND ART

Along with the progress of high-power lasers, applications to industrial processing such as welding using laser light are widely employed. Especially in recent years, high-power fiber lasers having an output of as high as 10 kW have been developed and are expected to be used for medical and industrial applications. In such a high-power fiber laser, for example as illustrated in Non-Patent Literature 1, the core area is enlarged in a short optical fiber of several meters or less, thereby relaxing an output power limit due to nonlinearity. Moreover, in laser processing, the beam quality of emitted light greatly affects the processing efficiency. Since the beam quality strongly depends on a mode state of emitted light, an optical fiber capable of single mode transmission is used in a fiber laser.

Furthermore as illustrated in Non-Patent Literature 2, an optical fiber is coupled to an emitting end of the high-power laser described above, which is applied also to welding processing from a remote place. In this case, the beam quality at the emitting end is affected by an excitation state of a higher order mode in the coupled optical fiber. Therefore, connecting a multimode optical fiber having a large core area as a transmission optical fiber enables transmission of high-power light such as several kilowatts for several tens of meters or more, however, the beam quality at the emitting end becomes low. In order to enhance the beam quality, it is necessary to reduce the number of propagation modes; however, in structure design of the optical fibers in general, reduction of the number of propagation modes and enlargement of a core area are in a trade-off relationship, and thus an attempt to enhance the beam quality results in limiting the power that can be transmitted.

Furthermore as illustrated in Non-Patent Document 3, it is known that, by using a photonic crystal fiber having a hole structure, the trade-off between a single mode operation region and enlargement of a core area can be relaxed as compared with a general optical fiber in which a refractive index distribution is formed by adding a dopant to a core. Therefore, it is known that, in a photonic crystal fiber for a communication application, deterioration of tradition characteristics due to a nonlinear effect can be mitigated in an optical communication system. Furthermore in Patent Literature 1, it is known that the trade-off between the single mode operation region and enlargement of a core area can be further relaxed as compared with a uniform structure by using a photonic crystal fiber in which holes are arranged non-uniformly.

CITATION LIST

Patent Literature

Patent Literature 1: International Publication WO 2011/093349

Non Patent Literatures

Non-Patent Literature 1: Himeno, "Kousyutsuryoku laser no kiso to tokuchou", Fujikura Technical Journal, vol. 1, pp. 1-6, January 2014.

Non-Patent Literature 2: Yamazaki et al., "10 kW Long-length Cables for Laser Transmission Incorporated with Eight Optical Fibers", R & D Review of Mitsubishi Cable Industries, Ltd., No. 105, pp. 24-27, October 2008.

Non-Patent Literature 3: Matsui et al., "Photonic Crystal Fiber no Jikkou Danmenseki Kakudai ni Kansuru Kenntou", The Institute of Electronics, Information and Communication Engineers, B-13-21, September 2008.

Non-Patent Literature 4: G. P. Agrawal, "Nonlinear Fiber Optics", ACADEMIC PRESS. pp. 278-279.

SUMMARY OF INVENTION

Technical Problem

As described above, obtaining a wide core area with a small number of propagation modes in order to obtain high quality and high output power with a long propagation distance is in a trade-off relationship in the conventional optical fibers, and thus there is a problem that high-power light having high output and a high quality cannot be obtained. Furthermore, even in the case of using a photonic crystal fiber, in industrial high-power transmission applications of a kilowatt class far exceeding communication applications, there is a problem that it is unknown how much the trade-off is improved and that structure design suitable for obtaining high quality and high output power is unclear.

Therefore, in order to solve the above problems, an object of the present invention is to provide a photonic crystal fiber in which a wide core area can be obtained with a limited number of propagation modes and a high-power optical transmission system including the photonic crystal fiber and having a high beam quality.

Solution to Problem

According to the present invention, holes of a photonic crystal fiber are arranged such that, in a cross section, a hole ratio, which is an area of the holes per unit area, is larger in a central side than in an outer side in a portion corresponding to a cladding and that a wide core area can be obtained while the number of modes that can be propagated is limited to several. Moreover, in a high-power optical transmission system according to the present invention, the amount of axis misalignment between the central axis of a laser oscillator and the central axis of the photonic crystal fiber is less than or equal to a certain amount.

Specifically, a first photonic crystal fiber according to the present invention is a photonic crystal fiber having a plurality of holes arranged in the optical fiber along a longitudinal direction, in which, in a cross section, a hole ratio which is an area of the holes per unit area is larger in a central side than in an outer side in a portion corresponding to a cladding, an interval among all of the holes is $\Lambda$, and a diameter d1 of the holes in the central side is larger than a diameter d of the holes in the outer side, and, when $\Lambda$ is represented in a horizontal axis and d1/d is represented in a vertical axis, $\Lambda$, d1, and d are in a region where respective regions represented by mathematical formulas C1 overlap, and a bending loss of a basic mode is 1 dB/km with a bending radius of 500 mm or less.

[Mathematical Formulas C1]

$d1/d \leq 0.633\Lambda - 5.467 (\Lambda \leq 11.8 \, \mu m)$ $d1/d \leq -0.0429\Lambda + 2.486 (11.8 \, \mu m \leq \Lambda \leq 15.4 \, \mu m)$ $d1/d \geq 0.0454\Lambda 1.13 (\Lambda \geq 15.4 \, \mu m)$ $d1/d \geq 1 (\Lambda \leq 16.8 \, \mu m)$ $d1/d \geq 0.117\Lambda - 0.96 (\Lambda \geq 16.8 \, \mu m)$ (C1)

It is preferable that the number of propagation modes of the first photonic crystal fiber according to the present invention is three or less in order not to deteriorate the beam quality even in a case where incident light from a laser oscillator and a mode field diameter of the photonic crystal fiber are not matched.

Moreover, the first photonic crystal fiber according to the present invention enables high power transmission of light and thus does not generate output saturation due to stimulated Raman scattering upon propagation of light of 90 kW·m.

A second photonic crystal fiber according to the present invention is a photonic crystal fiber having a plurality of holes arranged in the optical fiber along a longitudinal direction, in which, in a cross section, a hole ratio which is an area of the holes per unit area is larger in a central side than in an outer side in a portion corresponding to a cladding, a diameter of all of the holes is d, and an interval $\Lambda 1$ of the holes in the central side is smaller than an interval $\Lambda$ of the holes in the outer side, and, when $\Lambda$ is represented in a horizontal axis and $d/\Lambda$ is represented in a vertical axis, $\Lambda$ and d are in a region where respective regions represented by mathematical formulas C2 overlap, and a bending loss of a basic mode is 1 dB/km with a bending radius of 500 mm or less.

[Mathematical Formulas C2]

$d/\Lambda \leq 0.24\Lambda - 2.22 (\Lambda \leq 10.8 \, \mu m)$ $d/\Lambda \leq 0.00667\Lambda + 0.293 (10.8 \, \mu m \leq \Lambda \leq 19.5 \, \mu m)$ $d/\Lambda \leq 0.01\Lambda + 0.23 (\Lambda \geq 19.5 \, \mu m)$ $d/\Lambda 0.3 (\Lambda \leq 19.2 \, \mu m)$ $d/\Lambda \geq 0.0195\Lambda - 0.075 (\Lambda \geq 19.2 \, \mu m)$ (C2)

It is preferable that the number of propagation modes of the second photonic crystal fiber according to the present invention is three or less in order not to deteriorate the beam quality even in a case where incident light from a laser oscillator and a mode field diameter of the photonic crystal fiber are not matched.

Moreover, the second photonic crystal fiber according to the present invention enables high power transmission of light and thus does not generate output saturation due to stimulated Raman scattering upon propagation of light of 90 kW·m.

A third photonic crystal fiber according to the present invention is a photonic crystal fiber having a plurality of holes arranged in the optical fiber along a longitudinal direction, in which, in a cross section, a hole ratio which is an area of the holes per unit area is larger in a central side than in an outer side in a portion corresponding to a cladding, three or more layers having different hole ratios from each other are arranged concentrically with a layer closer to the center having a larger hole ratio, a diameter d of all the holes are the same, and, when an interval $\Lambda$ between a hole in a central layer closest to the center and a hole in an adjacent layer adjacent to the central layer is represented in a horizontal axis and $d/\Lambda$ is represented in a vertical axis, $\Lambda$ and d are in a region where respective regions represented by mathematical formulas C3 overlap, and a bending loss of a basic mode is 1 dB/km with a bending radius of 500 mm or less.

[Mathematical Formulas C3]

$d/\Lambda \leq 0.22\Lambda - 2.01 (\Lambda \leq 10.9 \, \mu m)$ $d/\Lambda \leq -0.000769\Lambda + 0.398 (10.9 \, \mu m \leq \Lambda \leq 16.1 \, \mu m)$ $d/\Lambda \leq 0.004\Lambda + 0.32 (\Lambda \geq 16.1 \, \mu m)$ $d/\Lambda \geq 0.00172\Lambda + 0.322 (\Lambda \leq 15.2 \, \mu m)$ $d/\Lambda \geq 0.0064\Lambda + 0.250 (\Lambda \geq 15.2 \, \mu m)$ (C3)

It is preferable that the number of propagation modes of the third photonic crystal fiber according to the present invention is three or less in order not to deteriorate the beam quality even in a case where incident light from a laser oscillator and a mode field diameter of the photonic crystal fiber are not matched.

Moreover, the third photonic crystal fiber according to the present invention enables high power transmission of light and thus does not generate output saturation due to stimulated Raman scattering upon propagation of light of 90 kW m.

A fourth photonic crystal fiber according to the present invention is a photonic crystal fiber having a plurality of holes arranged in the optical fiber along a longitudinal direction, in which, in a cross section, a hole ratio which is an area of the holes per unit area is larger in a central side than in an outer side in a portion corresponding to a cladding, three or more layers having different hole ratios from each other are arranged concentrically with a layer closer to the center having a larger hole ratio, a diameter d of all the holes are the same, and, when an interval $\Lambda$ between a hole in a central layer closest to the center and a hole in an adjacent layer adjacent to the central layer is represented in a horizontal axis and $d/\Lambda$ is represented in a vertical axis, $\Lambda$ and d are in a region where respective regions represented by mathematical formulas C4 overlap, and a bending loss of a basic mode is 1 dB/km with a bending radius of 500 mm or less.

[Mathematical Formulas C4]

$d/\Lambda \leq 0.22\Lambda - 2.01 (\Lambda \leq 11 \, \mu m)$ $d/\Lambda \leq 0.407 (11 \, \mu m \leq \Lambda \leq 18.7 \, \mu m)$ $d/\Lambda \leq 0.00333\Lambda + 0.345 (\Lambda \geq 18.7 \, \mu m)$ $d/\Lambda \geq 0.00167\Lambda + 0.323 (\Lambda \leq 14.5 \, \mu m)$ $d/\Lambda \geq 0.00625\Lambda + 0.255 (\Lambda \geq 14.5 \, \mu m)$ (C4)

It is preferable that the number of propagation modes of the fourth photonic crystal fiber according to the present invention is four or less in order not to deteriorate the beam quality even in a case where incident light from a laser oscillator and a mode field diameter of the photonic crystal fiber are not matched.

Moreover, the fourth photonic crystal fiber according to the present invention enables high power transmission of light and thus does not generate output saturation due to stimulated Raman scattering upon propagation of light of 90 kW·m.

By allowing a hole structure of a photonic crystal fiber nonuniform in the range of the mathematical formulas C1 to C4, it is possible to obtain a wide core area while the number of modes that can be propagated is limited to several. Therefore, the present invention enables provision of a photonic crystal fiber in which a wide core area can be obtained with a limited number of propagation modes.

Furthermore, a high-power optical transmission system according to the present invention includes a laser oscillator, the photonic crystal fiber, and a coupling part for emitting light from the laser oscillator to the photonic crystal fiber, in which, in the coupling part, an amount of misalignment between a central axis of the light emitted from the laser oscillator and a central axis of the photonic crystal fiber is 0.95 or less as a relative value relative to a mode field radius of the photonic crystal fiber, and a beam radius of the light from the laser oscillator relative to a mode field radius of the photonic crystal fiber is 0.5 or more.

Since an LP01 mode and LP21 have component peaks at positions shifted from the center of the fiber, the coupling efficiency increases when there is axis misalignment at a connecting part of the optical fiber. Therefore, by allowing the amount of misalignment between the central axis of the light emitted from the laser oscillator and the central axis of the photonic crystal fiber to be 0.95 or less as a relative value with respect to the mode field radius of the photonic crystal fiber, the coupling efficiency between the LP01 mode and LP21 from a laser emitting part to the photonic crystal fiber can be reduced. Therefore, even when an effective cross-sectional area of the photonic crystal fiber is enlarged, the power of a propagation mode other than the basic mode can be reduced, and the beam quality can be enhanced. Therefore, the present invention can provide a high-power optical transmission system that includes a photonic crystal fiber in which a wide core area can be obtained with a limited number of propagation modes and has a high beam quality.

Advantageous Effects of Invention

The present invention can provide a photonic crystal fiber in which a wide core area can be obtained with a limited number of propagation modes and a high-power optical transmission system including the photonic crystal fiber and having a high beam quality.

DESCRIPTION OF EMBODIMENTS

Embodiments of the present invention will be described with reference to the accompanying drawings. The embodiments described below are examples of the present invention, and the present invention is not limited to the following embodiments. Note that components having the same symbol in the present description and the drawings represent items identical to each other.

First Embodiment

Figure 1:
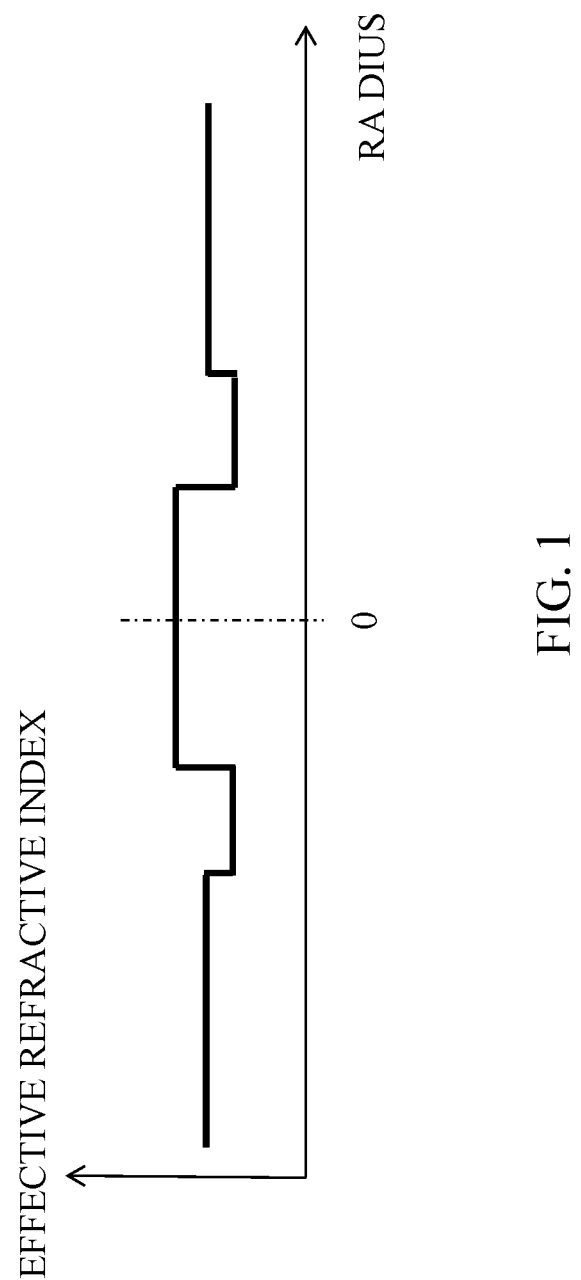
FIG. 1 is a schematic diagram illustrating an example of an effective refractive index distribution of a high-power optical transmission optical fiber.

FIG. 1 is an example of an effective refractive index distribution in a high-power optical transmission optical fiber. In the present optical fiber, by arranging a layer having a refractive index lower than that of an outer cladding region around a core region, a trade-off between enlargement of a core area and reduction in the number of modes is improved, thus implementing both higher quality and higher power of output light in high-power optical transmission. Particularly in this embodiment, in order to implement control of fine refractive index difference, a plurality of holes is arranged in a uniform quartz glass, and the arrangement and/or the size of the holes are controlled for each layer, thereby implementing the effective refractive index distribution illustrated in FIG. 1.

A photonic crystal fiber of the present embodiment has a plurality of holes arranged in the optical fiber along a longitudinal direction, in which, in a cross section, a hole ratio which is an area of the holes per unit area is larger in a central side than in an outer side in a portion corresponding to a cladding, and the number of propagation modes in which propagation is possible is 3 or less.

Figure 2:
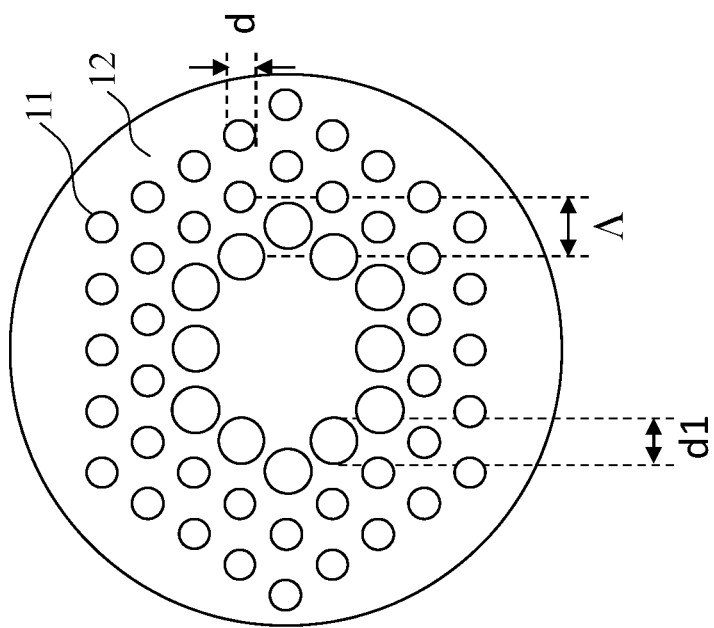
FIG. 2 is a schematic view illustrating an exemplary structure of a photonic crystal fiber according to the present invention.

FIG. 2 is an exemplary structure 1 of a photonic crystal fiber as a high-power optical transmission optical fiber. In the photonic crystal fiber of FIG. 2, holes 11 are arranged in quartz 12 in a hexagonal close-packed manner with a hole interval $\Lambda$, and a core region is formed by not arranging holes in a region corresponding to seven holes in the center of the optical fiber. Moreover, only holes of the first layer adjacent to the core region have a hole diameter d1 larger than a hole diameter d of holes arranged on an outer side thereof. By setting d1>d, an effective refractive index of the first layer becomes lower than that of a hole layer on an outer side thereof, thereby the refractive index distribution illustrated in FIG. 1 is implemented.

Figure 3:
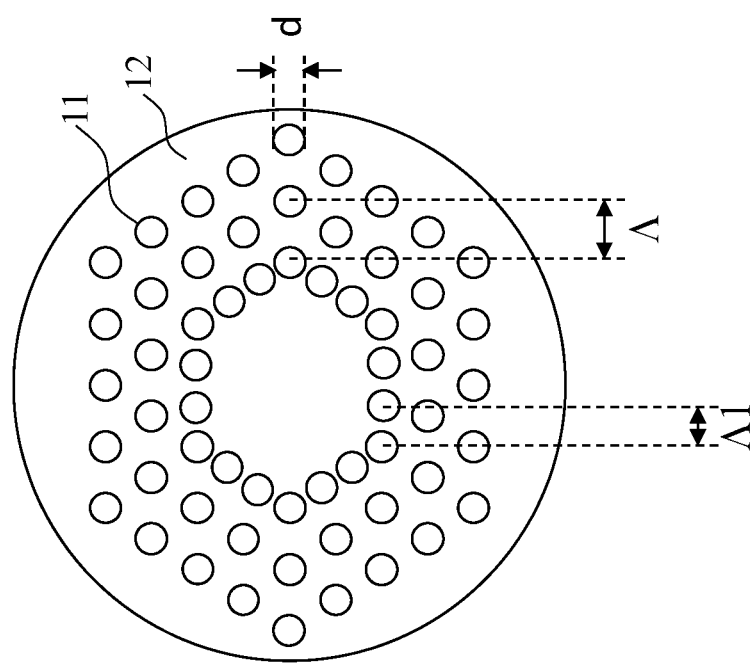
FIG. 3 is a schematic view illustrating an exemplary structure of a photonic crystal fiber according to the present invention.

FIG. 3 is an exemplary structure 2 of a photonic crystal fiber as a high-power optical transmission optical fiber. In the photonic crystal fiber of FIG. 3, a plurality of holes 11 having a constant diameter d is arranged in quartz 12 in a plurality of hexagonal shapes. Like in FIG. 2, a core region is formed in the center by not arranging holes in a region corresponding to seven holes in the center of the optical fiber. In the structure of FIG. 3, a distance $\Lambda 1$ between adjacent holes in the first layer adjacent to the core region is smaller than a distance $\Lambda$ between holes in hole layers on an outer side thereof. By setting $\Lambda 1 < \Lambda$, a hole density of the first layer becomes higher than that of the outer side, thereby the refractive index distribution illustrated in FIG. 1 is implemented. Here, since the size of the holes are all constant in the structure of FIG. 3, it is unnecessary to perform size control for each hole at the time of manufacturing a base material and spinning the optical fiber, and thus the manufacturing process is relatively simple and thus is preferable as compared with the structure of FIG. 2.

Figure 4:
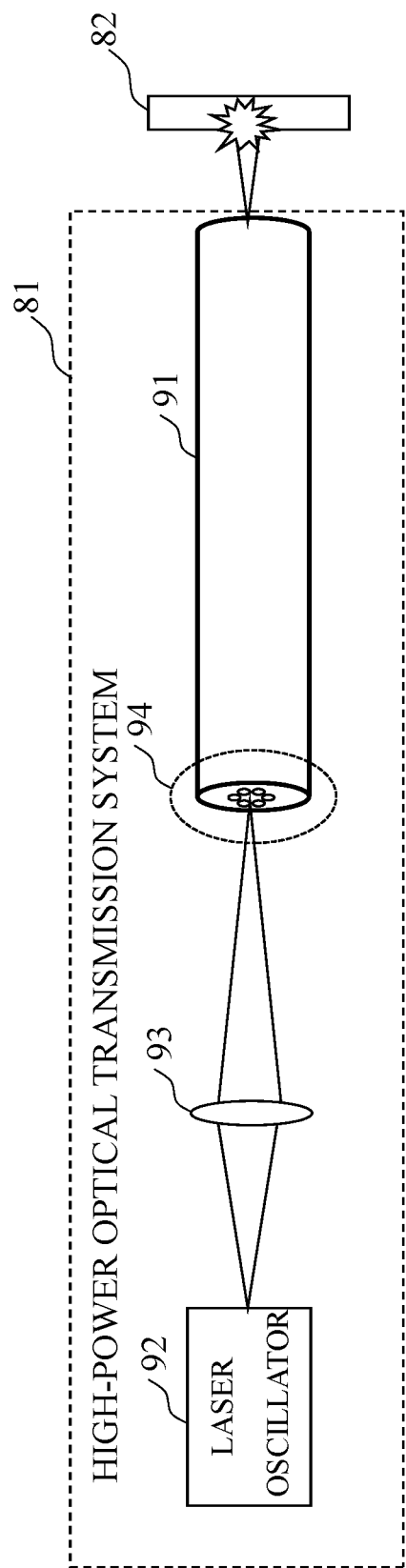
FIG. 4 is a schematic diagram illustrating an exemplary configuration of a high-power optical transmission system according to the present invention.

FIG. 4 illustrates an exemplary configuration of a transmission system 81 to which a high-power optical transmission optical fiber 91 of the present invention is applied. Included are a laser oscillator 92 for emitting high output light and a lens 93 for allowing the output light to be focused on the center of a core region of the optical fiber and emitting the light. Here, a workpiece 82 is arranged at an output part of the optical fiber and subjected to processing such as cutting, and as the beam quality M2 of output light of the optical fiber is closer to 1, the accuracy and efficiency of processing can be much more improved.

Figure 5:
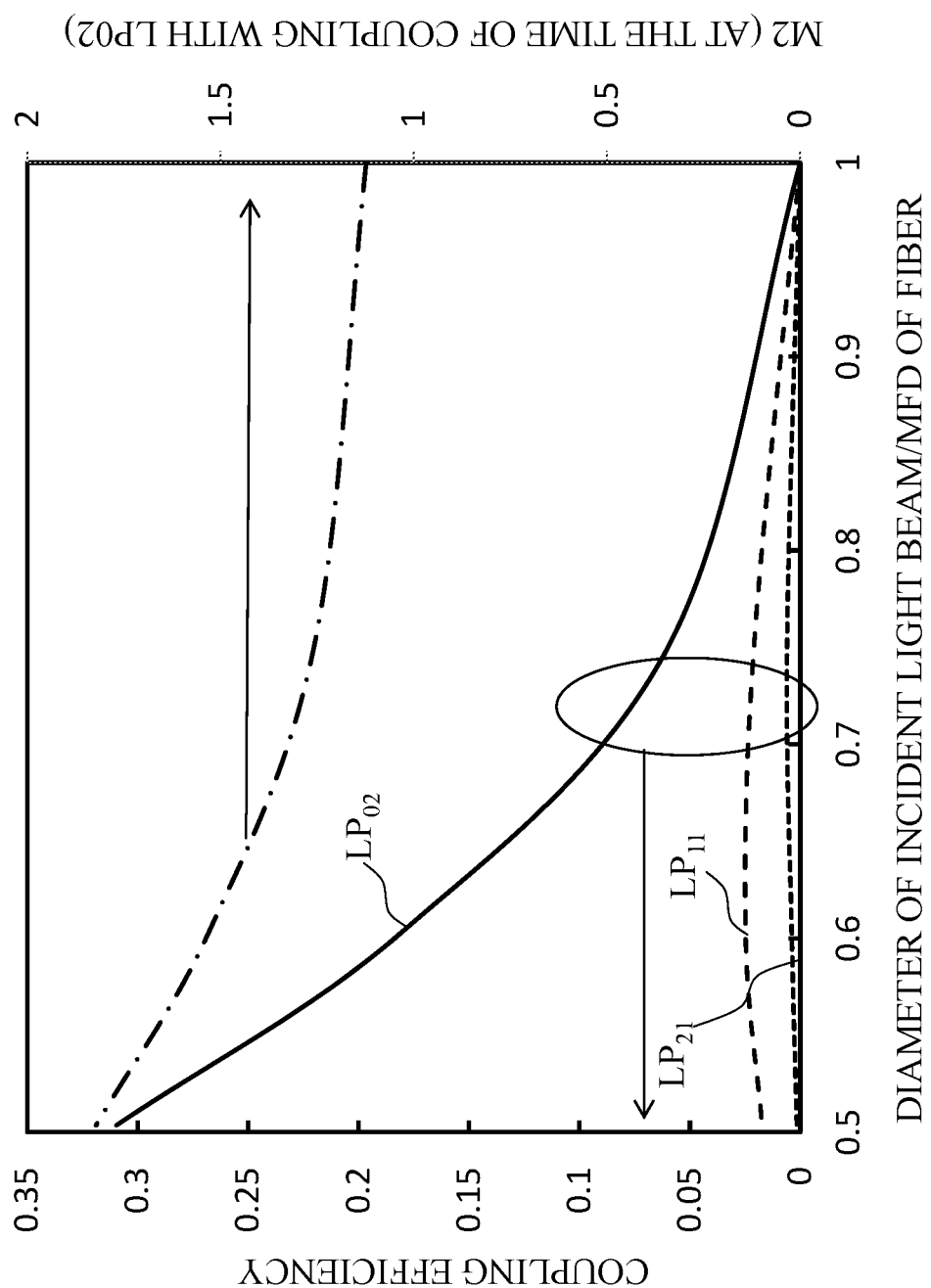
FIG. 5 is a characteristic diagram illustrating the coupling efficiency and the M2 of output light with a higher-order mode with respect to mismatch of beam diameters of incident light and an optical fiber in the high-power optical transmission system according to the present invention.

In FIG. 5, the coupling efficiency with a basic mode (LP01) and LP11, LP21, and LP02 modes are illustrated with respect to mismatch of mode field diameters (MFDs) of incident light and a transmission optical fiber (MFD of incident light/MFD of the fiber). In the absence of mismatch of the MFDs, the beam quality is not deteriorated since in coupling to the LP01 mode is entirely implemented under ideal conditions without disturbance such as axis misalignment; however, in general, a perfect match of MFDs of the laser oscillator and the transmission optical fiber is extremely rare. Even in a case where there is an MFD mismatch, the coupling efficiency with the LP11 and the LP21 modes is as quite small as 5% or less. This is because electric field distributions of both modes do not have a component near the center thereof, and thus coupling with incident light does not occur. On the other hand, in the LP02 mode having an electric field distribution similar to that of the basic mode, the coupling efficiency increases along with the MFD mismatch, which increases the value of M2 illustrated on the vertical axis on the right side, thereby deteriorating the beam quality. Therefore, in the high-power transmission optical fiber and the transmission system of the present invention, in order to avoid deterioration of the beam quality of output light, by adopting a photonic crystal fiber having a structure in which the LP02 mode is not propagated, it is possible to stably obtain output light of a high quality independently of the degree of an MFD mismatch between the laser oscillator and the transmission optical fiber. Furthermore even in a case where the LP02 mode can be propagated, when a ratio between a beam diameter of incident light and an MFD of the optical fiber is 0.5 or more as illustrated in FIG. 5, M2 is 2 or less, and thus output light of a high quality can be obtained.

Figure 6:
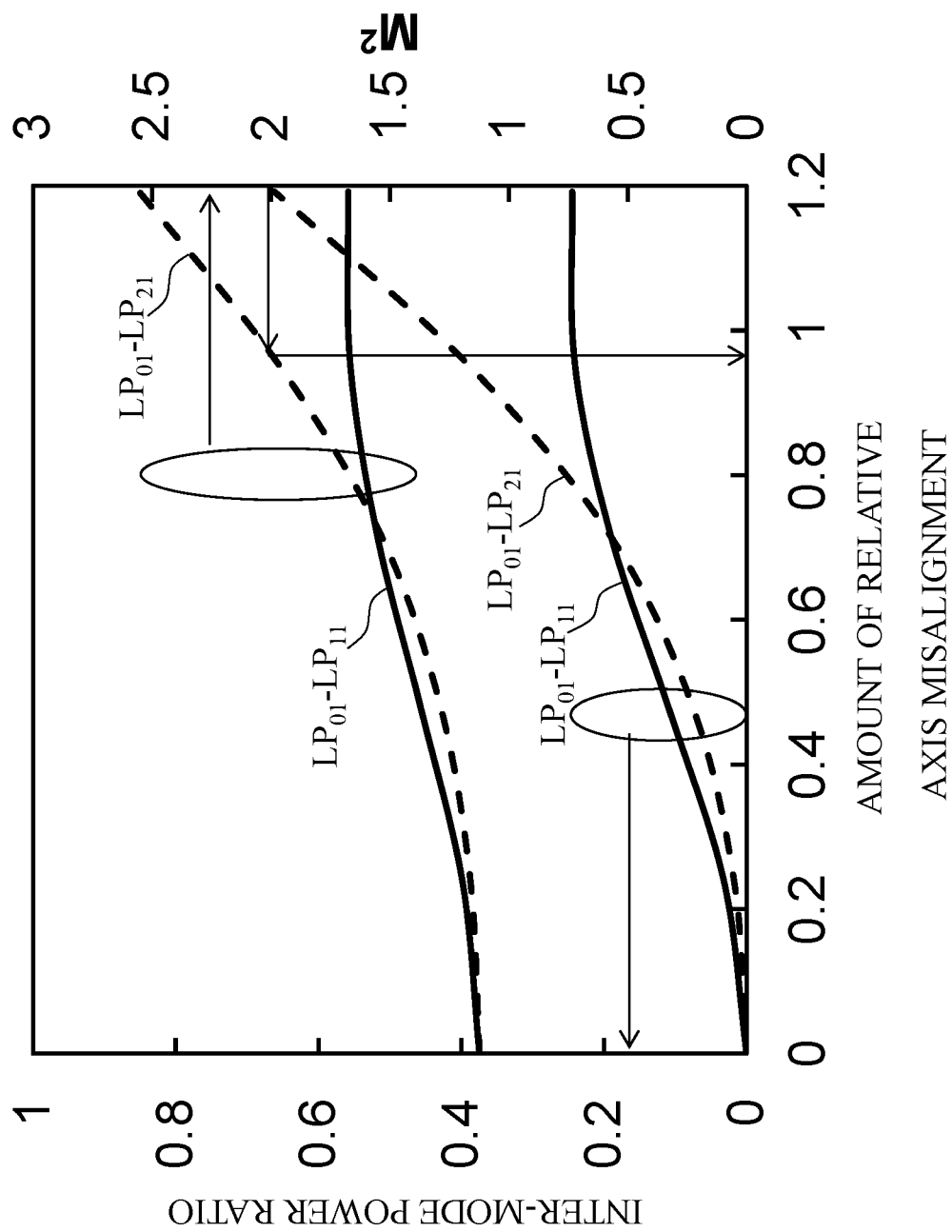
FIG. 6 is a characteristic diagram illustrating the coupling efficiency with an LP11 mode and an LP21 mode due to axis misalignment in the high-power optical transmission system according to the present invention.
Figure 7:
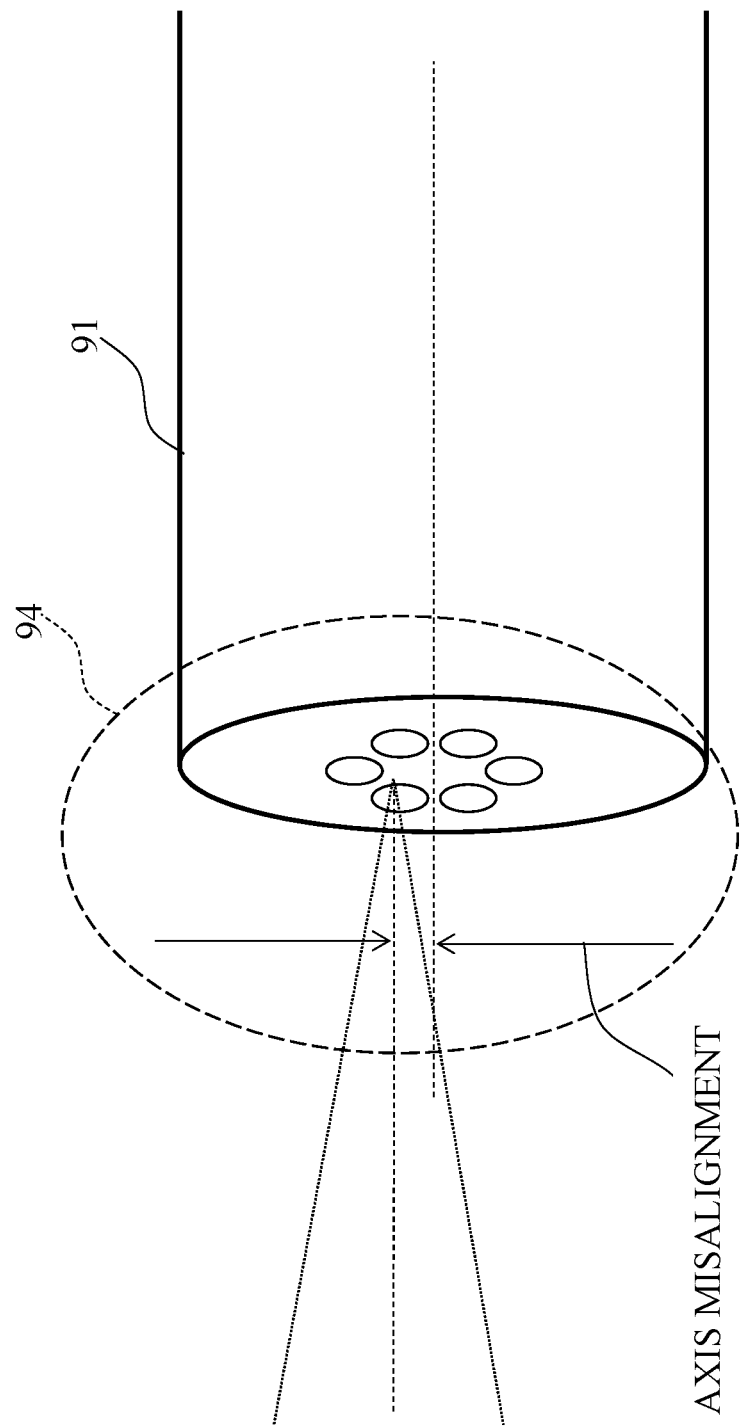
FIG. 7 is a diagram for explaining the relationship between the center of incident light and the center of an optical fiber in the high-power optical transmission system according to the present invention.

FIG. 6 illustrates the coupling efficiency of the LP11 and the LP21 modes and the change in $M^2$ with respect to axis misalignment. The horizontal axis represents a relative value of the amount of axis misalignment from the center with respect to the mode field radius of the LP01 mode of the fiber. Since the LP11 and the LP21 modes have a peak at a position shifted from the center of the fiber, the coupling efficiency of these higher order modes is increased by axis misalignment, and as a result, the beam quality is deteriorated. In order to avoid deterioration of the output light beam quality (increase in $M^2$) by these higher order modes, for example in order to allow $M^2$ to be 2.0 or less, it is necessary to set the amount of relative axis misalignment to 0.95 or less. Therefore in the high-power optical transmission system of the present invention, by controlling the amount of axis misalignment between the center axis of the laser oscillator, that is, an optical axis of output light of the laser oscillator and the central axis of the photonic crystal fiber at a coupling part 94 to be 0.95 or less relative to the mode field the radius of the transmission optical fiber as illustrated in FIG. 7, it is possible to obtain extremely high-quality output light with an $M^2$ of 2.0 or less.

Figure 8:
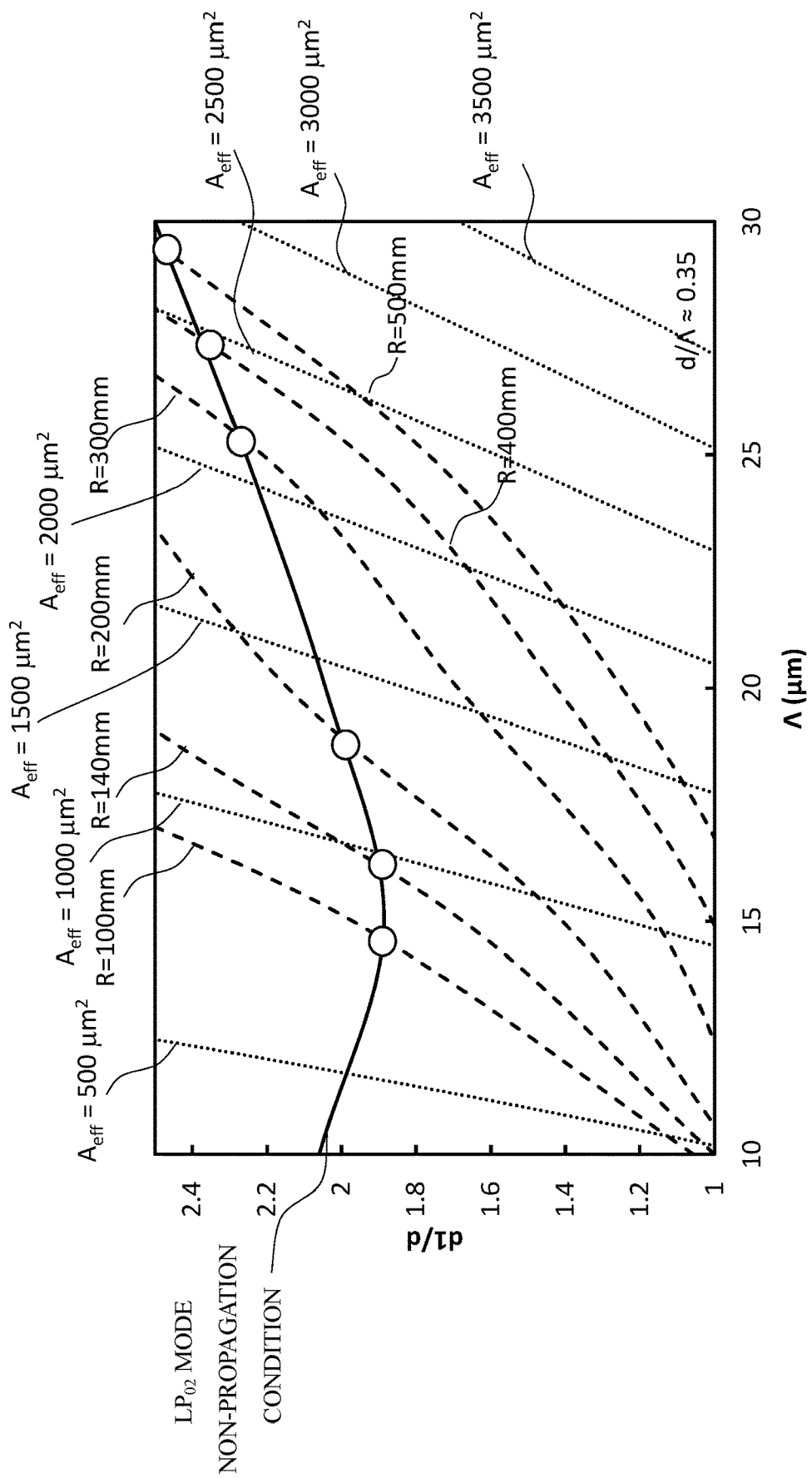
FIG. 8 is a diagram for explaining structural conditions in the photonic crystal fiber according to the present invention.

In FIG. 8, structural conditions of the high-power optical transmission optical fiber of the present invention using the structure illustrated in FIG. 2 are illustrated. Note that the structural conditions have been obtained by numerical calculation analysis. The figure illustrates structural conditions at a wavelength of 1.06 μm, and a solid line in the figure is obtained by calculating and plotting structural conditions under which a loss with respect to the LP02 mode is 0.1 dB/m, and the LP02 mode is not propagated in a region under the solid line. A broken line is obtained by calculating and plotting structural conditions under which a bending loss in the basic mode is 1 dB/km at a bending radius R illustrated in the figure, and the bending loss in the basic mode can be sufficiently lowered in a region in the left from the broken line, and a high-power optical transmission optical fiber and an optical fiber cable with a low loss can be obtained.

Here, the maximum value of output light power can be increased by enlarging an effective cross-sectional area of the basic mode, and the effective cross-sectional area can be enlarged by increasing the inter-hole interval Λ of the PCF. Therefore, at an intersection of the solid line and the broken line, propagation in the LP02 mode and increase in the bending loss can be simultaneously prevented, and the effective cross-sectional area can be maximized at a bending radius corresponding to the broken line.

Here, the relationship between the maximum value of output light power (maximum output power) and the effective cross-sectional area of the basic mode will be described. The maximum output power $P_{th}$ is determined by an output power limit (stimulated Raman threshold) due to stimulated Raman scattering out of the nonlinearity and is expressed by the following mathematical formula.

[Mathematical Formula C5]

$$P_{th} = \frac{16A_{\text{eff}}}{g_R L} \quad (C5)$$

Note that the above mathematical formula is widely known as a mathematical formula for deriving a saturation threshold of output power by the stimulated Raman including Non-Patent Literature 4, where $g_R$ represents a Raman gain coefficient, Aeff represents an effective cross-sectional area, and L represents a transmission distance.

Leff can be derived from a transmission loss α and the transmission distance L by Leff=(1−exp(αL))α, however in a case where the transmission distance is relatively short such as about 1 km or less, Leff and L can be regarded as equivalent. Therefore, as a high-power transmission performance, a product $P_{th}$·L of the induced Raman threshold $P_{th}$ and the transmission distance L which is a parameter proportional to Aeff can be used. Note that, according to Non-Patent Literature 4, in the case of pure quartz, gR is about 1.0 $e^{-13}$ m/W at a wavelength of 1.06 μm. For example, where Aeff is 500 pmt, the high-power transmission performance $P_{th}$·L is about 90 kW·m.

Furthermore, structural conditions under which the effective cross-sectional area is a predetermined value is illustrated by a dotted line in FIG. 8. The effective cross-sectional area relates to an output of laser and a propagation distance of the optical fiber. For example, in general, a laser output used as an industrial laser is about 300 W, and assuming remote control of about 300 m, 90 kW·m is obtained. An effective cross-sectional area Aeff of an optical fiber that allows light of 90 kW·m to be propagated can be derived by the stimulated Raman threshold and is about 500 μm². A leftmost dotted line illustrated in FIG. 8 is a line for an effective cross-sectional area Aeff=500 μm², and a right side of the dotted line is a region where light of 90 kW·m or more can be propagated.

Figure 9:
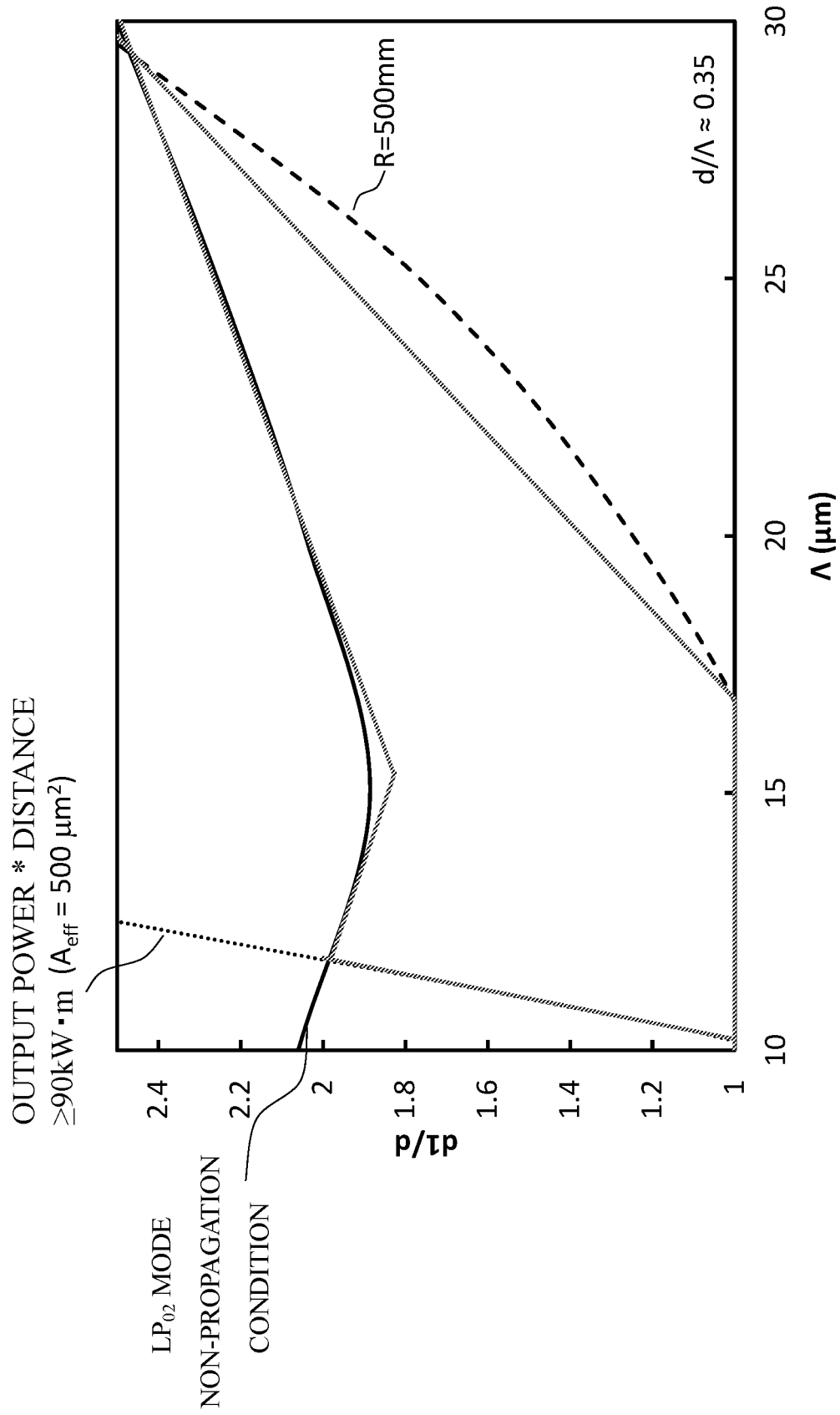
FIG. 9 is a diagram for explaining structural conditions in the photonic crystal fiber according to the present invention.

In FIG. 9, a region approximating, by a polygon, a region surrounded by a plurality of linear functions (solid line, broken line, dotted line) with respect to the structural conditions illustrated in FIG. 8 is illustrated. From FIG. 9, a high-power transmission optical fiber having the structure of FIG. 2 that satisfies requirements of 90 kW·m or more, three or less propagation modes, and a bending radius of 500 mm or less is given by the C1.

[Mathematical Formulas C1]

$d1/d \leq 0.633Λ − 5.467 (Λ 11.8$ μm$)$ $d1/d \leq −0.0429Λ + 2.486 (11.8$ μm $\leq Λ 15.4$ μm$)$ $d1/d \geq 0.0454Λ 1.13 (Λ \geq 15.4$ μm$)$ $d1/d \geq 1 (Λ \leq 16.8$ μm$)$ $d1/d \geq 0.117Λ − 0.96 (Λ \geq 16.8$ μm$)$ \quad (C1)

Figure 10:
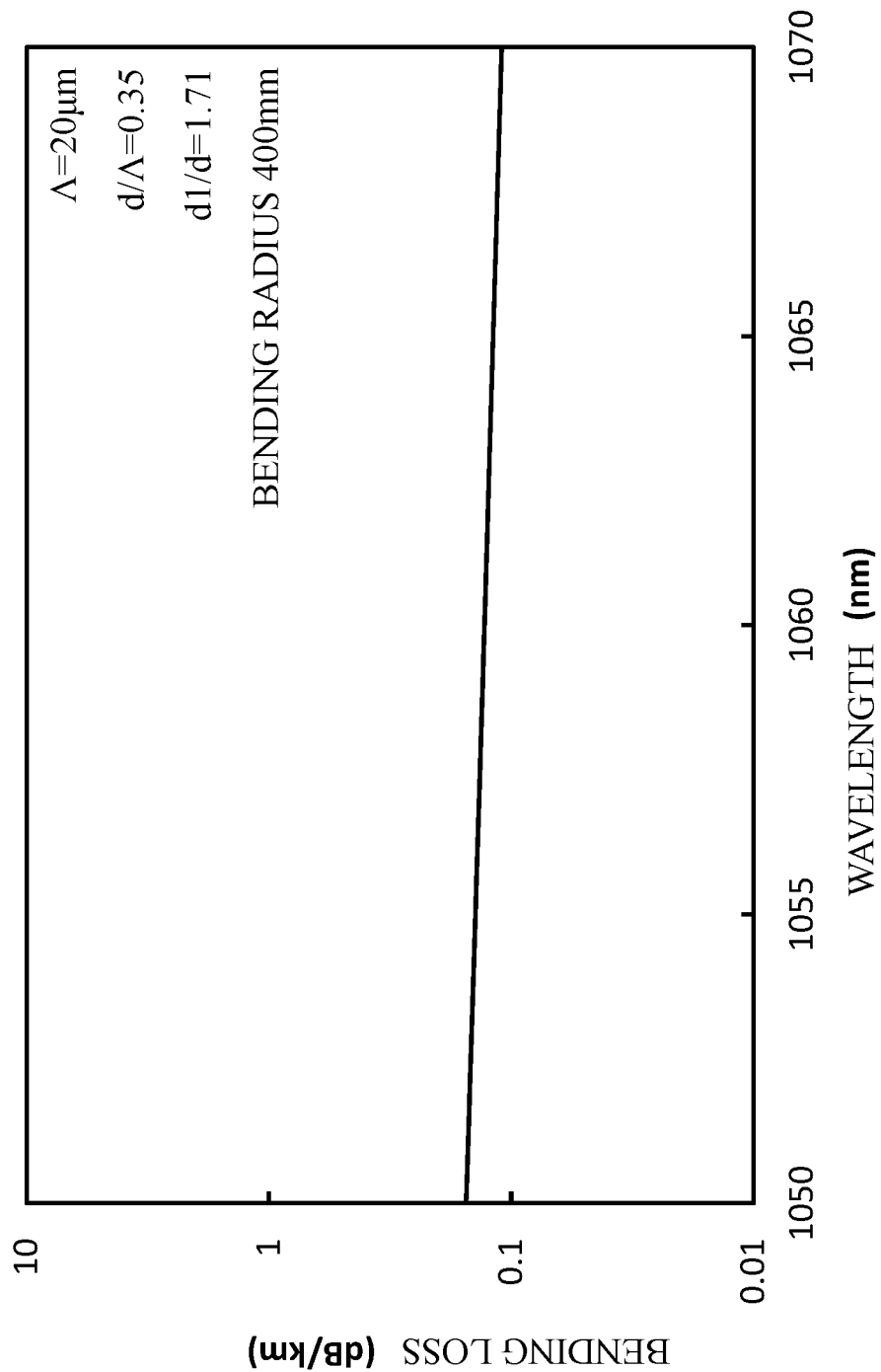
FIG. 10 is a diagram illustrating an example of wavelength dependency of bending loss in the photonic crystal fiber according to the present invention.

FIG. 10 illustrates an example of wavelength dependency of the bending loss in the structure illustrated in FIG. 2. Here, it is assumed that Λ=20 μm, d/Λ=0.35, and d1/d=1.71 hold with a bending radius of 400 mm. As illustrated in the figure, a change in the bending loss in the wavelength range of 1.06±0.01 μm is sufficiently small. Generally, YAG lasers used as high-output lasers are known to have a central wavelength of approximately 1.06 μm, and as illustrated in FIG. 10 the wavelength dependency of the bending loss near the central wavelength of a YAG laser is sufficiently small, it is clear that a design range derived using FIG. 8 or 9 is effective in a wavelength range of 1.05 to 1.07 μm.

Note that, in general, it is known that the bending loss of a PCF increases more as the wavelength becomes shorter, and it is obvious that the bending loss becomes further smaller as the wavelength becomes longer than 1.07 μm.

Figure 11:
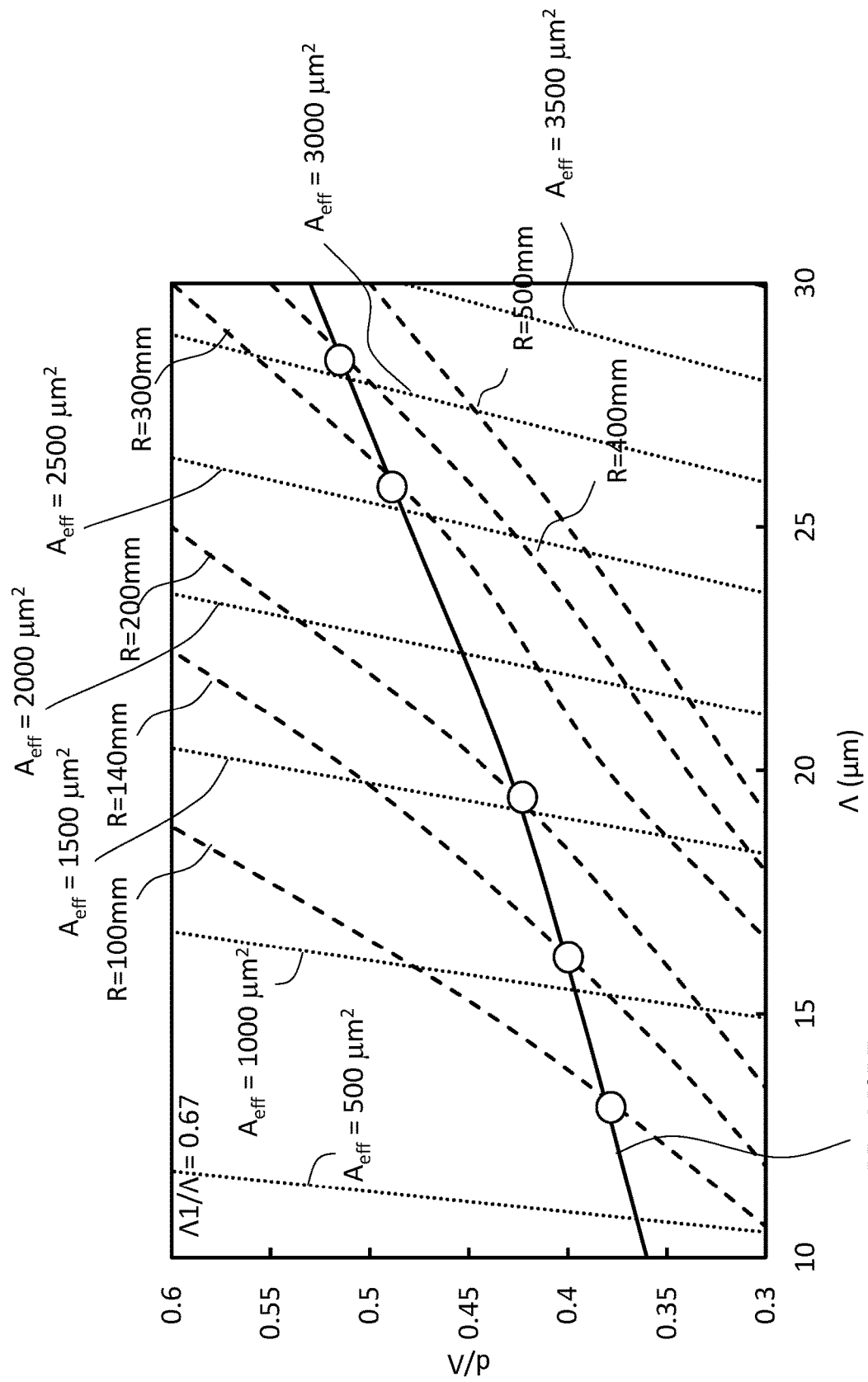
FIG. 11 is a diagram for explaining structural conditions in the photonic crystal fiber according to the present invention.

In FIG. 11, structural conditions of the high-power optical transmission optical fiber of the present invention using the structure illustrated in FIG. 3 are illustrated. Meanings of a solid line, broken lines, and dotted lines in FIG. 11 are the same as those in FIG. 8, and at an intersection of the solid line and a broken line, propagation in the LP02 mode and increase in the bending loss can be simultaneously prevented, and the effective cross-sectional area can be maximized at a bending radius corresponding to the broken line.

Figure 12:
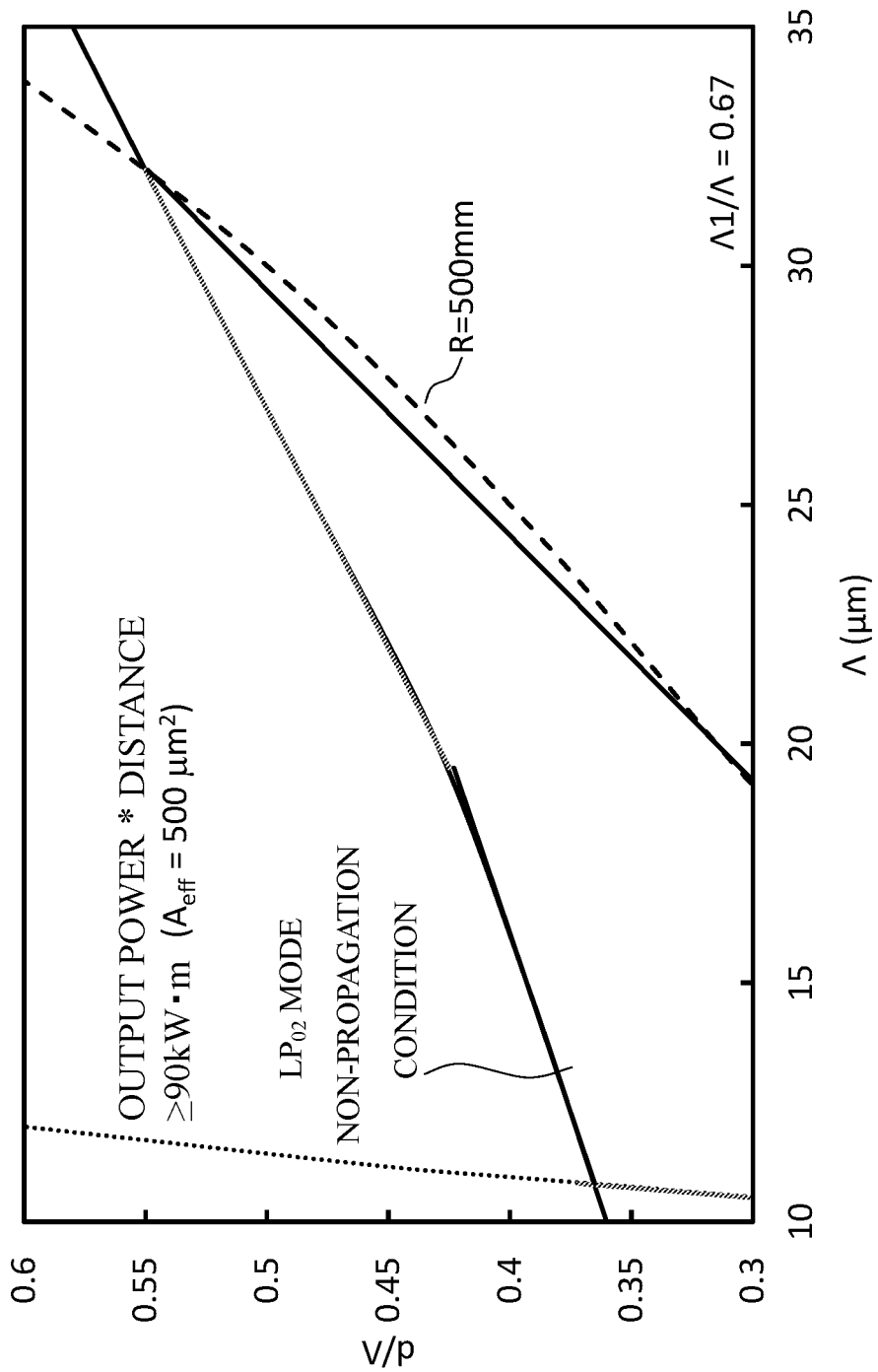
FIG. 12 is a diagram for explaining structural conditions in the photonic crystal fiber according to the present invention.

In FIG. 12, a region approximating, by a polygon, a region surrounded by a plurality of linear functions (solid line, broken line, dotted line) with respect to the structural conditions illustrated in FIG. 11 is illustrated. From FIG. 12, a high-power transmission optical fiber of the present invention having the structure of FIG. 3 that satisfies requirements of 90 kW·m or more, three or less propagation modes, and a bending radius of 500 mm or less is given by the C2.

[Mathematical Formulas C2]

$d/Λ \leq 0.24Λ − 2.22 (Λ \leq 10.8$ μm$)$ $d/Λ \leq 0.00667Λ + 0.293 (10.8$ μm $\leq Λ \leq 19.5$ μm$)$ $d/Λ \leq 0.01Λ + 0.23 (Λ \geq 19.5$ μm$)$ $d/Λ \geq 0.3 (Λ \leq 19.2$ μm$)$ $d/Λ \geq 0.0195Λ − 0.075 (Λ \geq 19.2$ μm$)$ \quad (C2)

Figure 13:
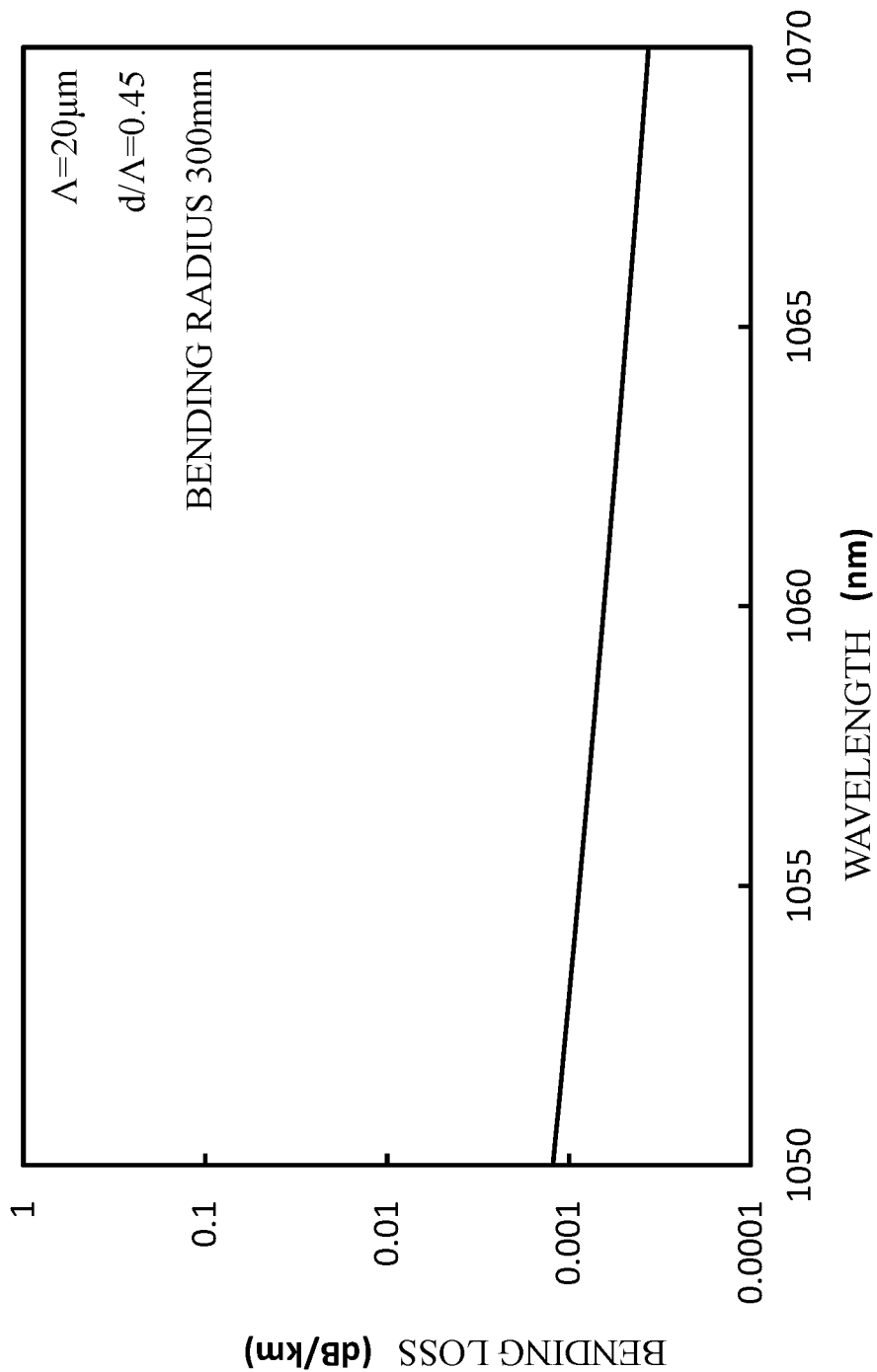
FIG. 13 is a diagram illustrating an example of wavelength dependency of bending loss in the photonic crystal fiber according to the present invention.

FIG. 13 illustrates an example of wavelength dependency of the bending loss in the structure illustrated in FIG. 3. Here, it is assumed that Λ=20 μm and d/Λ=0.45 hold with a bending radius of 300 mm. As illustrated in the figure, a change in the bending loss in the wavelength range of 1.06±0.01 µm is sufficiently small, and it is clear that design conditions derived using FIG. 11 or 12 are effective as same as in FIG. 10 in the above wavelength range.

Figure 14:
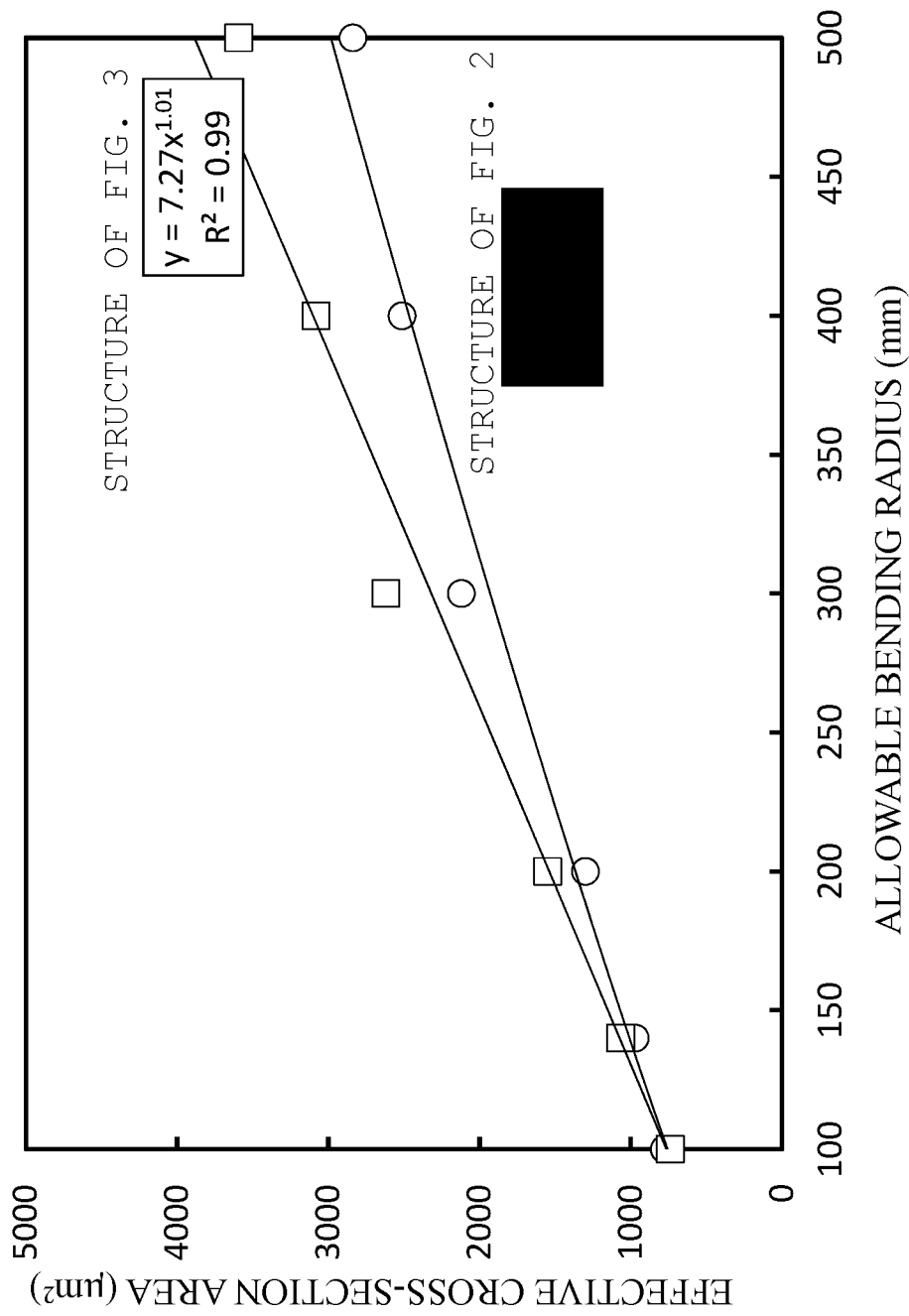
FIG. 14 is a characteristic diagram representing the relationship between the allowable bending radius and the effective cross-sectional area in the photonic crystal fiber according to the present invention.
Figure 15:
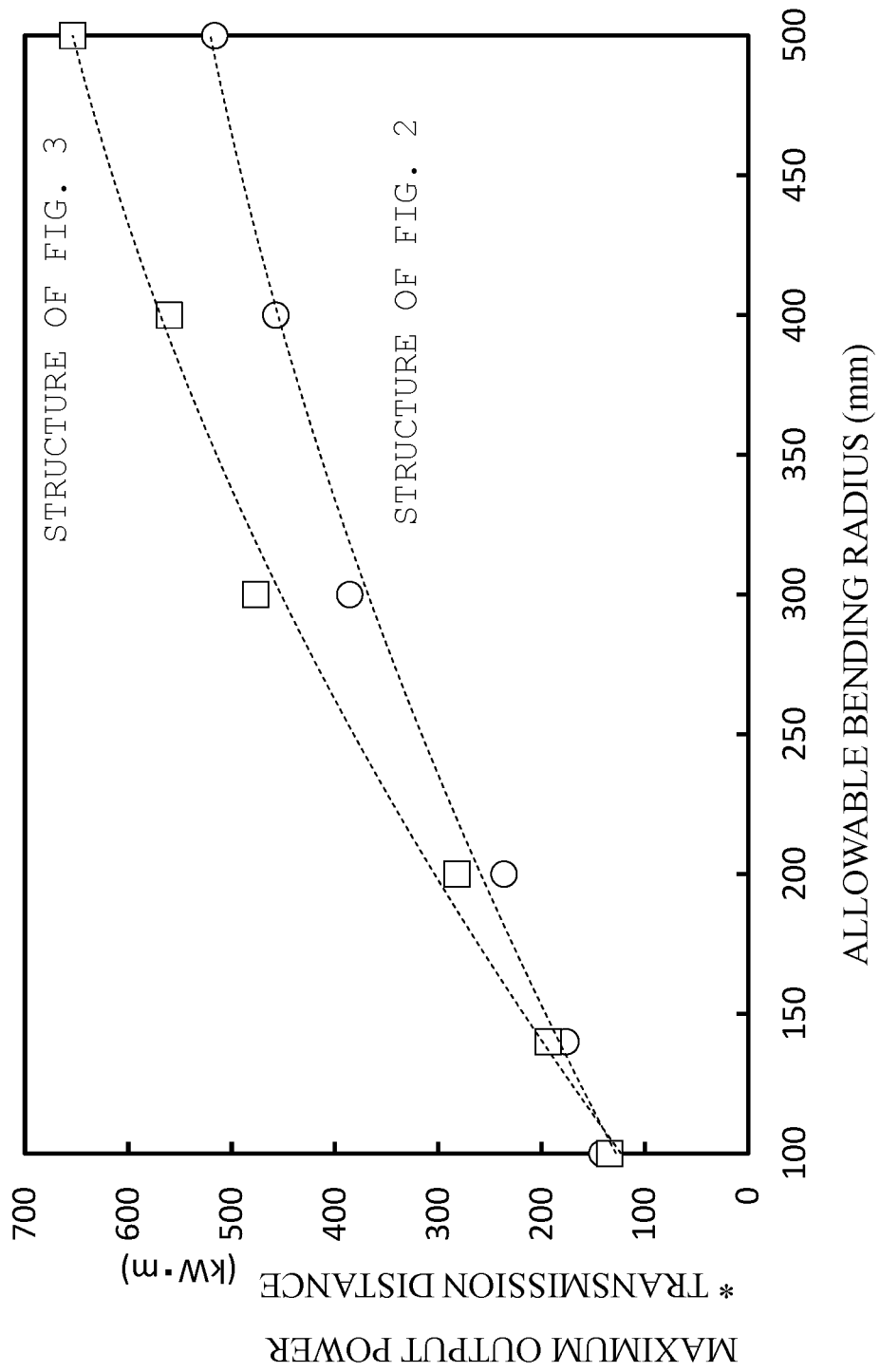
FIG. 15 is a characteristic diagram illustrating the relationship between an allowable bending radius and the maximum output power in the photonic crystal fiber according to the present invention.

FIG. 14 illustrates the relationship between the allowable bending radius and the effective cross-sectional area of the high-power optical transmission optical fiber of the present invention. Here, like the above, the allowable bending radius is a bending radius at which the bending loss is 1 dB/km or less with light having a wavelength of 1.06 µm propagated in the LP01 mode. Moreover, FIG. 15 illustrates the relationship between the allowable bending radius and the maximum output light power standardized by the transmission distance of the high-power optical transmission optical fiber of the present invention. Plots of "circle" and "quadrangle" in the figure represent the structures of FIGS. 2 and 3, respectively, and represent values at intersections of the solid line and the broken line in FIGS. 8 and 11, respectively. From FIG. 15, it is possible to enlarge an obtained effective cross-sectional area by relaxing the allowable bending radius, and changing the allowable bending radius from 100 mm to 500 mm allows the effective cross-sectional area to be enlarged from 700 µm² to 3600 µm² at the maximum.

There is a certain correlation between the effective cross-sectional area Aeff and the allowable bending radius R, and assuming Mathematical Formula 1 using proportional coefficients a and b results in a high correlation with the result of FIG. 14.

[Mathematical Formula 1]

$$\text{Aeff} \leq aR^b \quad (1)$$

For example in FIG. 14, a=14.9 and b=0.85 hold in the structure of FIG. 2, and a=7.27 and b=1.01 hold in the structure of FIG. 3, and in the region having an allowable bending radius of 500 mm or less, the maximum effective cross-sectional area obtained for a predetermined bending radius is approximately proportional to the allowable bending radius. A correlation coefficient representing the approximate accuracy for each of the above is 0.98 or more, which shows that the approximation of the mathematical formula (1) is effective for design of a PCF in a high-power optical transmission optical fiber. Therefore, by using the mathematical formula (1), it is possible to design a required bending radius with respect to a desired output light power, that is, an effective cross-sectional area.

For example, by using a PCF obtained by the structure design described above, in the case of transmission of about 50 m as illustrated in FIG. 15, an output of 2 kW or more can be obtained even under severe conditions such as an allowable bending radius of 100 mm or less, and increasing the allowable bending radius up to 400 mm enables obtaining an output of 10 kW or more. Moreover, it can be confirmed that high-power light of 1 kW or more can be transmitted over a long distance of 300 m or more by setting the allowable bending radius to about 200 to 300 mm.

Second Embodiment

In a PCF of the present embodiment, three or more layers having different ratios of holes 11 from each other are arranged concentrically with a layer closer to the center has a larger ratio of the holes 11, and the number of propagation modes that can propagate is 4 or less.

Figure 16:
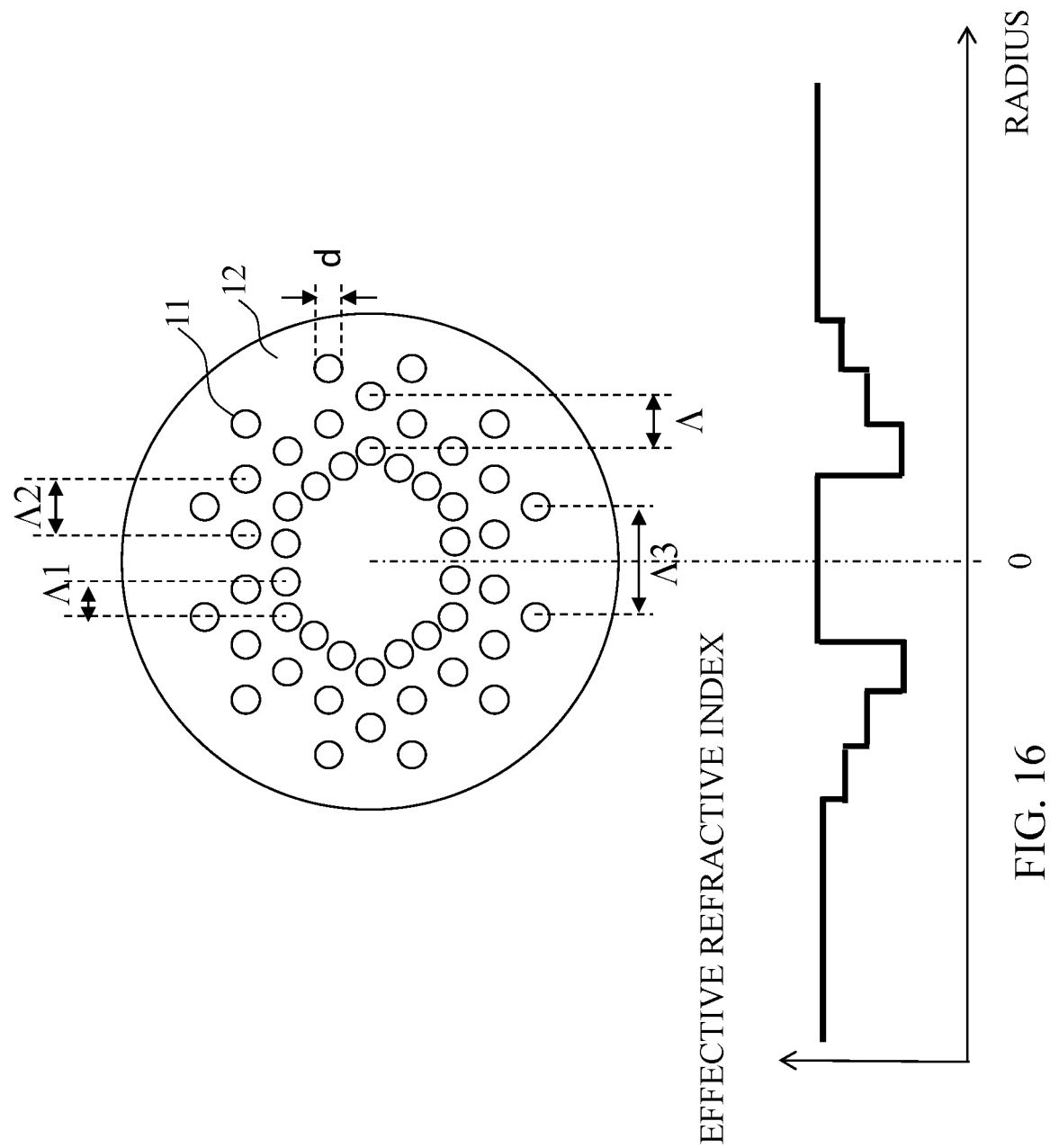
FIG. 16 is a schematic view illustrating an exemplary structure of the photonic crystal fiber according to the present invention.

FIG. 16 illustrates an exemplary structure of a high-power optical transmission optical fiber of the present invention. In the structure of FIG. 16, the diameter of all the holes are the same, and the holes are arranged such that and the refractive index is increased stepwise from a hole layer adjacent to a core region toward an outer side. As a result, it is possible to increase a leakage loss in a higher-order mode while the bending loss with a basic mode is mitigated and to further improve the trade-off between enlargement of a core area and reduction in the number of modes. In FIG. 16, by arranging holes in a first layer, a second layer, and a third layer at hole intervals Λ and increasing the hole density in each of the hole layers more in a layer closer to the center, the refractive index distribution described above is implemented. As a result, it is possible to further improve the trade-off between enlargement of a core area and reduction in the number of propagation modes with a smaller number of holes than that of the structure illustrated in FIG. 3, and since the size of the holes is constant, difficulty in manufacture can be preferably mitigated.

Figure 17:
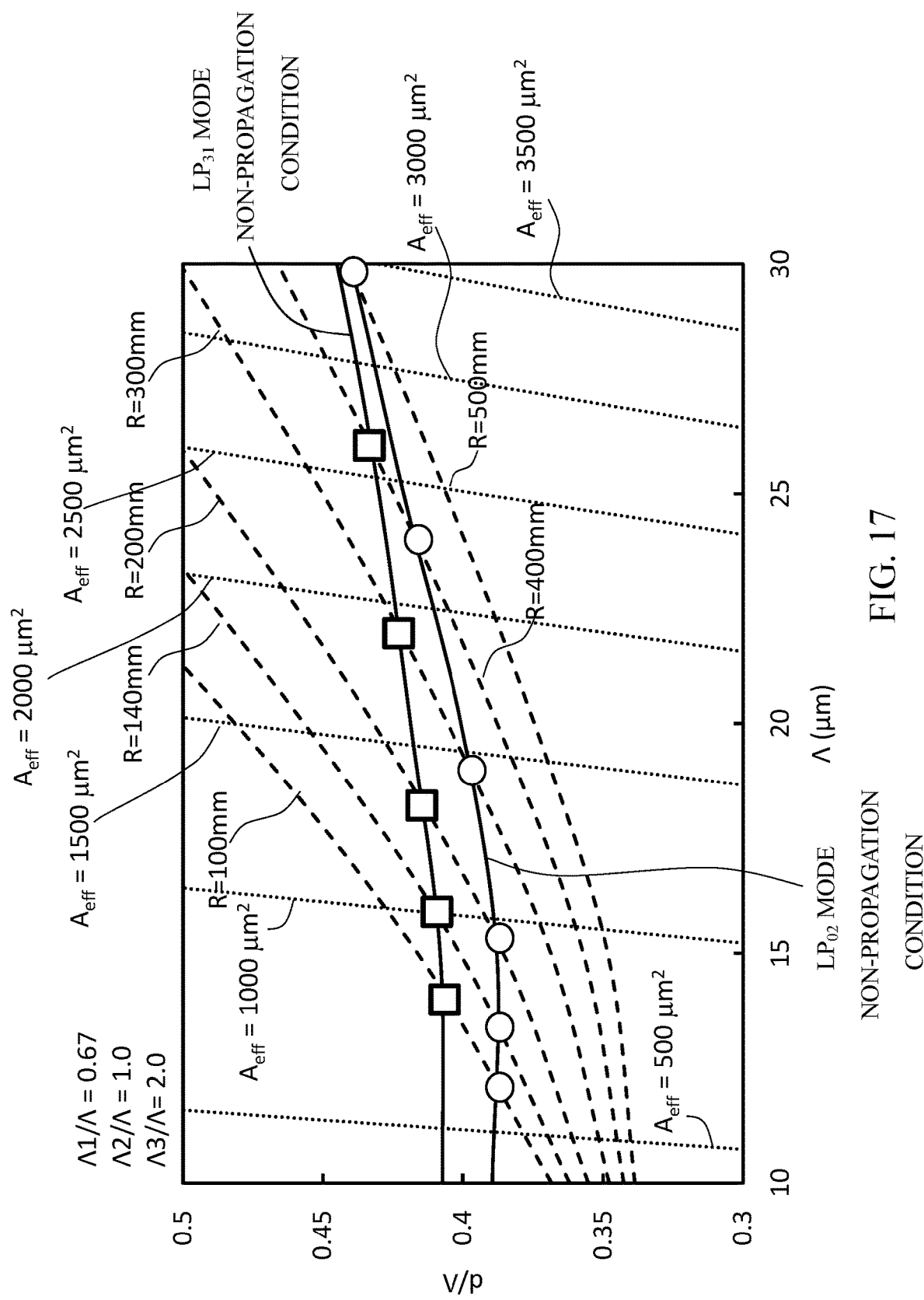
FIG. 17 is a diagram for explaining structural conditions in the photonic crystal fiber according to the present invention.

In FIG. 17, structural conditions of the high-power optical transmission optical fiber of the present invention using the structure illustrated in FIG. 16 are illustrated. In the figure, structural conditions at a wavelength of 1.06 µm are illustrated, and two solid lines in the figure illustrate structures in which the LP02 mode and the LP31 mode are non-propagating. That is, the number of propagation modes is 4 in a region under a solid line of a non-propagation condition of the LP31 mode, and the number of propagation modes is 3 in a region under a solid line of a non-propagation condition of the LP02 mode. A broken line represents a structural condition under which a bending loss of the basic mode is 1 dB/km at a bending radius R illustrated in the figure. Also, a dotted line represents a structural condition under which the effective cross-sectional area is a predetermined value (a value determined by power and the propagation distance of a laser).

Figure 18:
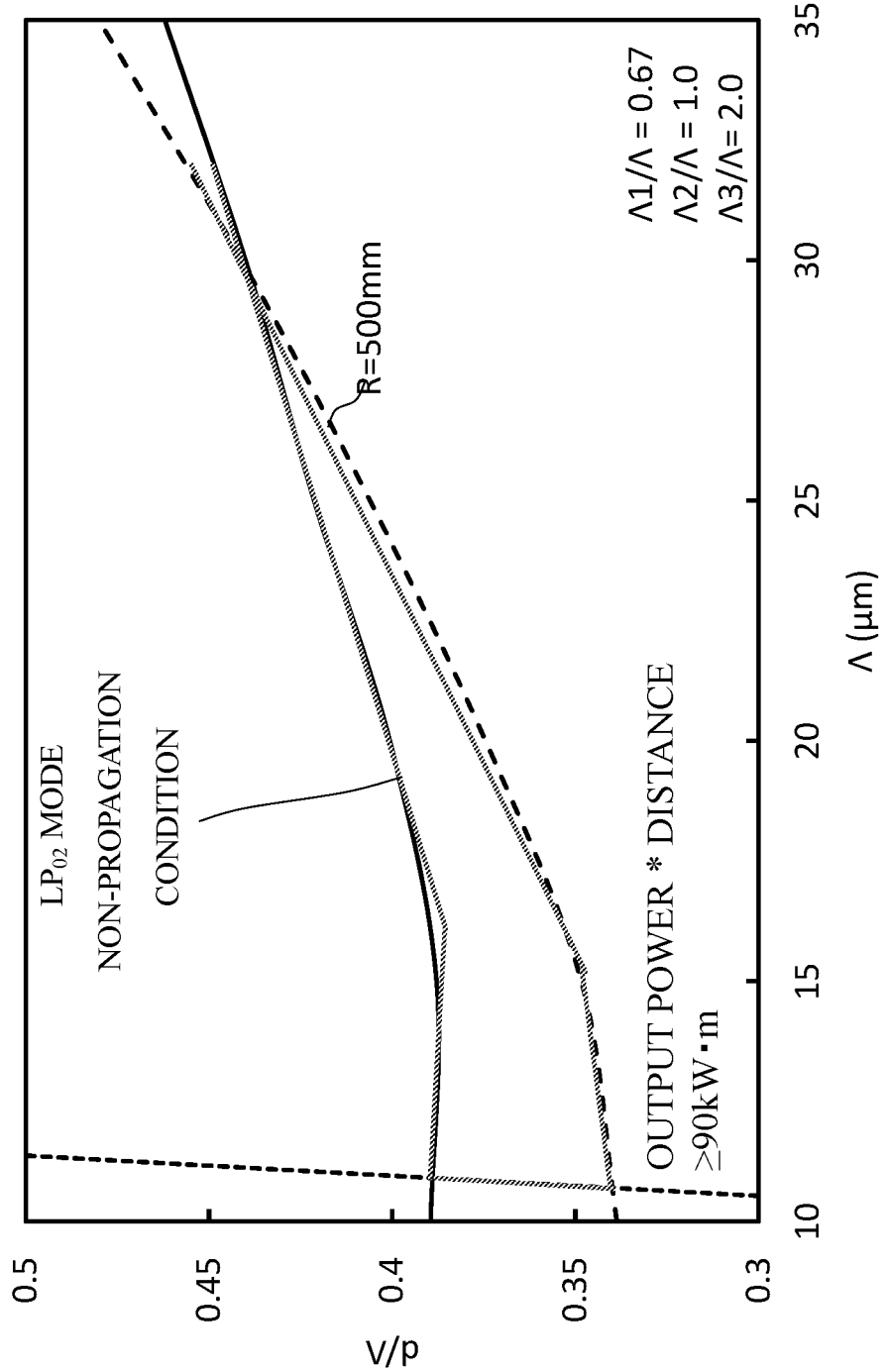
FIG. 18 is a diagram for explaining structural conditions in the photonic crystal fiber according to the present invention.

In FIG. 18, a region approximating, by a polygon, a region surrounded by a plurality of linear functions (solid line, broken line, dotted line) with respect to the structural conditions under which the number of propagation modes is 3 or less illustrated in FIG. 17 is illustrated. From FIG. 18, a high-power transmission optical fiber having the structure of FIG. 16 that satisfies requirements of 90 kW·m or more, three or less propagation modes, and a bending radius of 500 mm or less is given by the C3.

[Mathematical Formulas C3]

$$d/\Lambda \leq 0.22\Lambda - 2.01 (\Lambda \leq 10.9 \text{ µm})$$

$$d/\Lambda \leq -0.000769\Lambda + 0.398 (10.9 \text{ µm} \leq \Lambda \leq 16.1 \text{ µm})$$

$$d/\Lambda \leq 0.004\Lambda + 0.32 (\Lambda \geq 16.1 \text{ µm})$$

$$d/\Lambda \geq 0.00172\Lambda + 0.322 (\Lambda \leq 15.2 \text{ µm})$$

$$d/\Lambda \geq 0.0064\Lambda + 0.250 (\Lambda \geq 15.2 \text{ µm}) \quad (C3)$$

Figure 19:
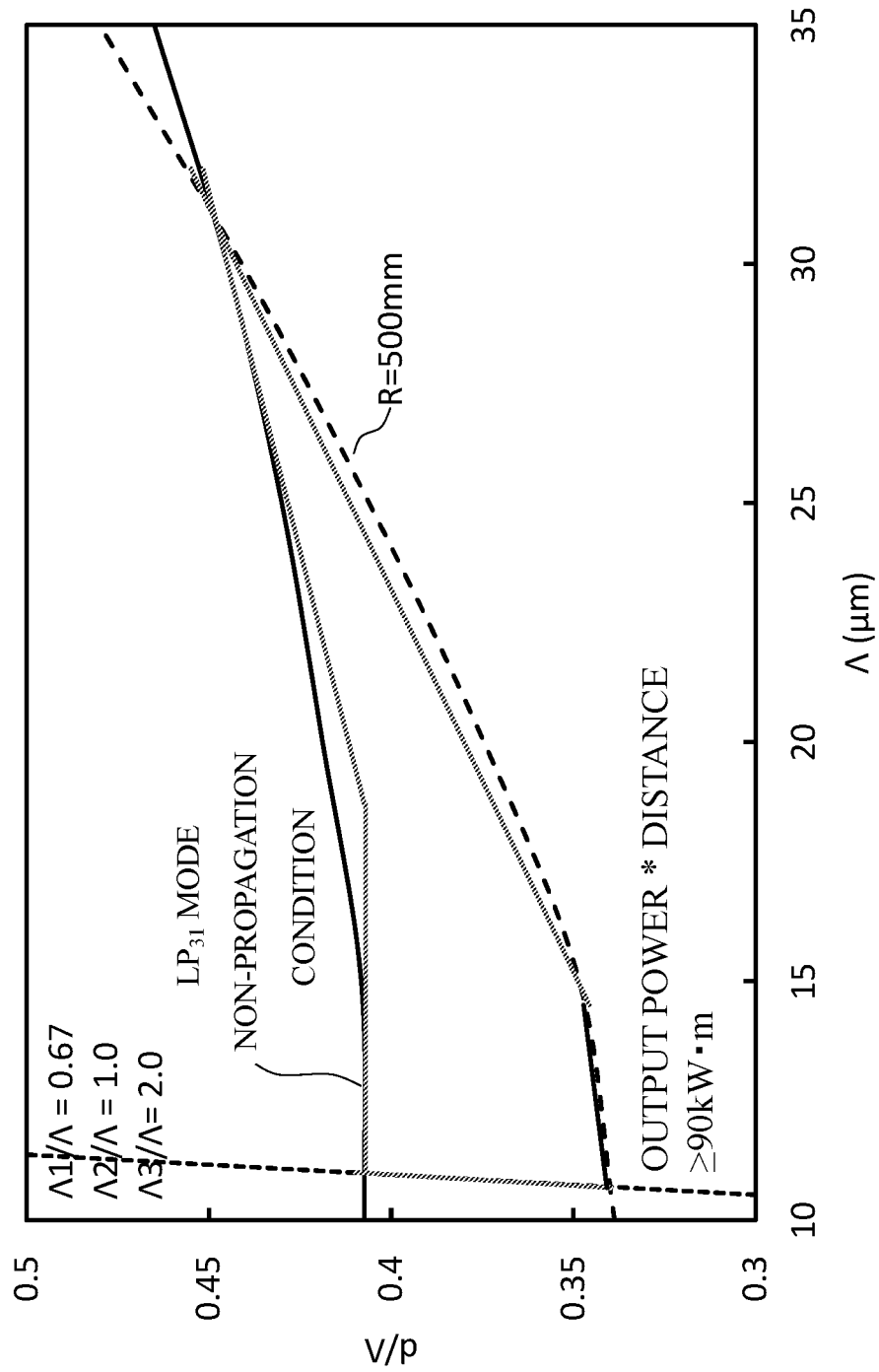
FIG. 19 is a diagram for explaining structural conditions in the photonic crystal fiber according to the present invention.

In FIG. 19, a region approximating, by a polygon, a region surrounded by a plurality of linear functions (solid line, broken line, dotted line) with respect to the structural conditions under which the number of propagation modes is 4 or less illustrated in FIG. 17 is illustrated. From FIG. 19, a high-power transmission optical fiber having the structure of FIG. 16 that satisfies requirements of 90 kW·m or more, four or less propagation modes, and a bending radius of 500 mm or less is given by the C4.

[Mathematical Formulas C4]

$$d/\Lambda \leq 0.22\Lambda - 2.01 (\Lambda \leq 11 \ \mu m)$$

$$d/\Lambda \leq 0.407 (11 \ \mu m \leq \Lambda \leq 18.7 \ \mu m)$$

$$d/\Lambda \leq 0.00333\Lambda + 0.345 (\Lambda \geq 18.7 \ \mu m)$$

$$d/\Lambda \geq 0.00167\Lambda + 0.323 (\Lambda \leq 14.5 \ \mu m)$$

$$d/\Lambda \geq 0.00625\Lambda + 0.255 (\Lambda \geq 14.5 \ \mu m) \quad (C4)$$

Figure 20:
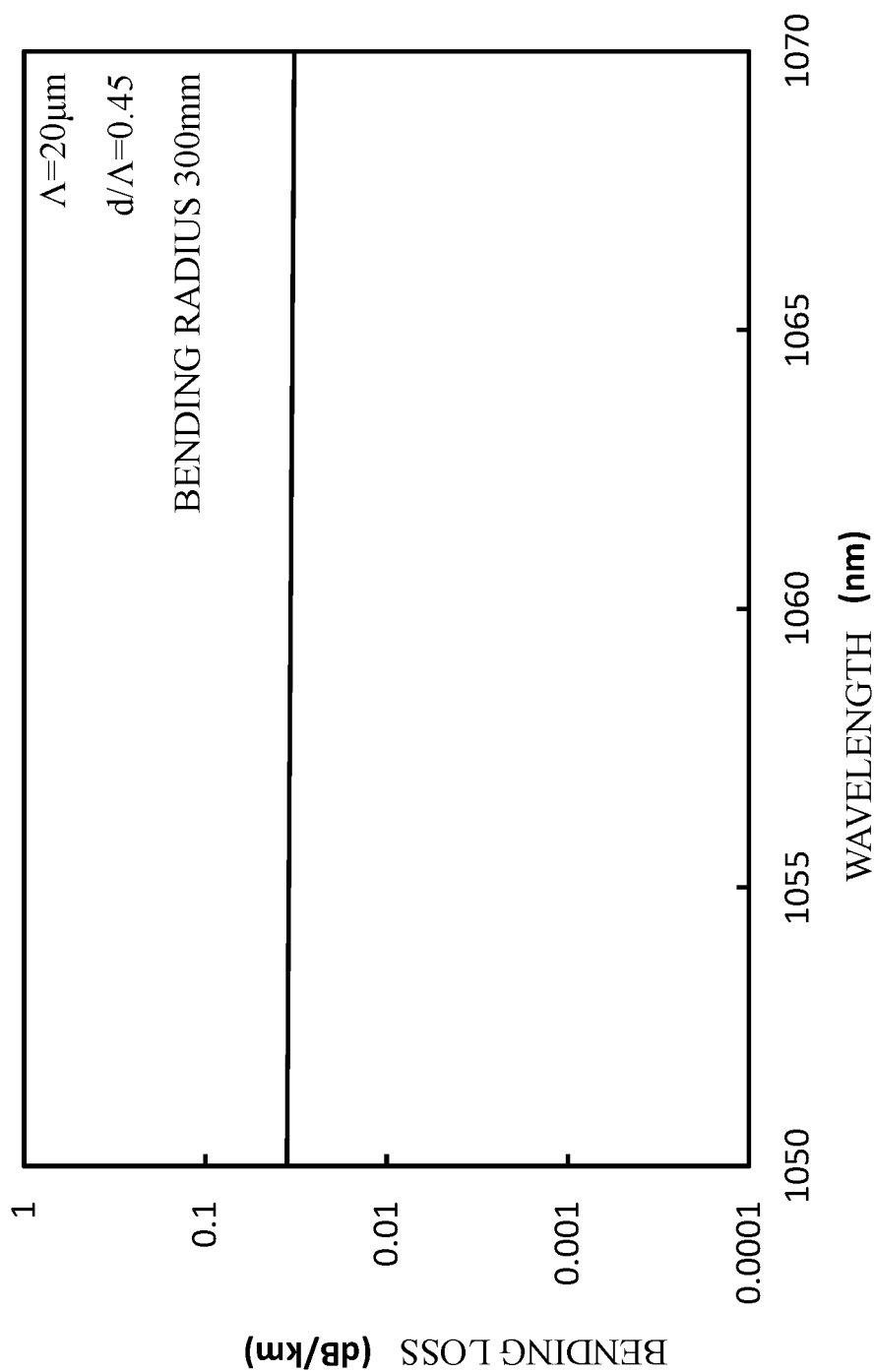
FIG. 20 is a diagram illustrating an example of wavelength dependency of bending loss in the photonic crystal fiber according to the present invention.

FIG. 20 illustrates an example of wavelength dependency of the bending loss in the structure illustrated in FIG. 16. Here, it is assumed that $\Lambda=20 \ \mu m$ and $d/\Lambda=0.45$ hold with a bending radius of 300 mm. As illustrated in the figure, a change in the bending loss in the wavelength range of $1.06\pm0.01 \ \mu m$ is sufficiently small, and it is clear that design conditions derived using FIGS. 17 to 19 are effective like in FIG. 10 in the above wavelength range.

Figure 21:
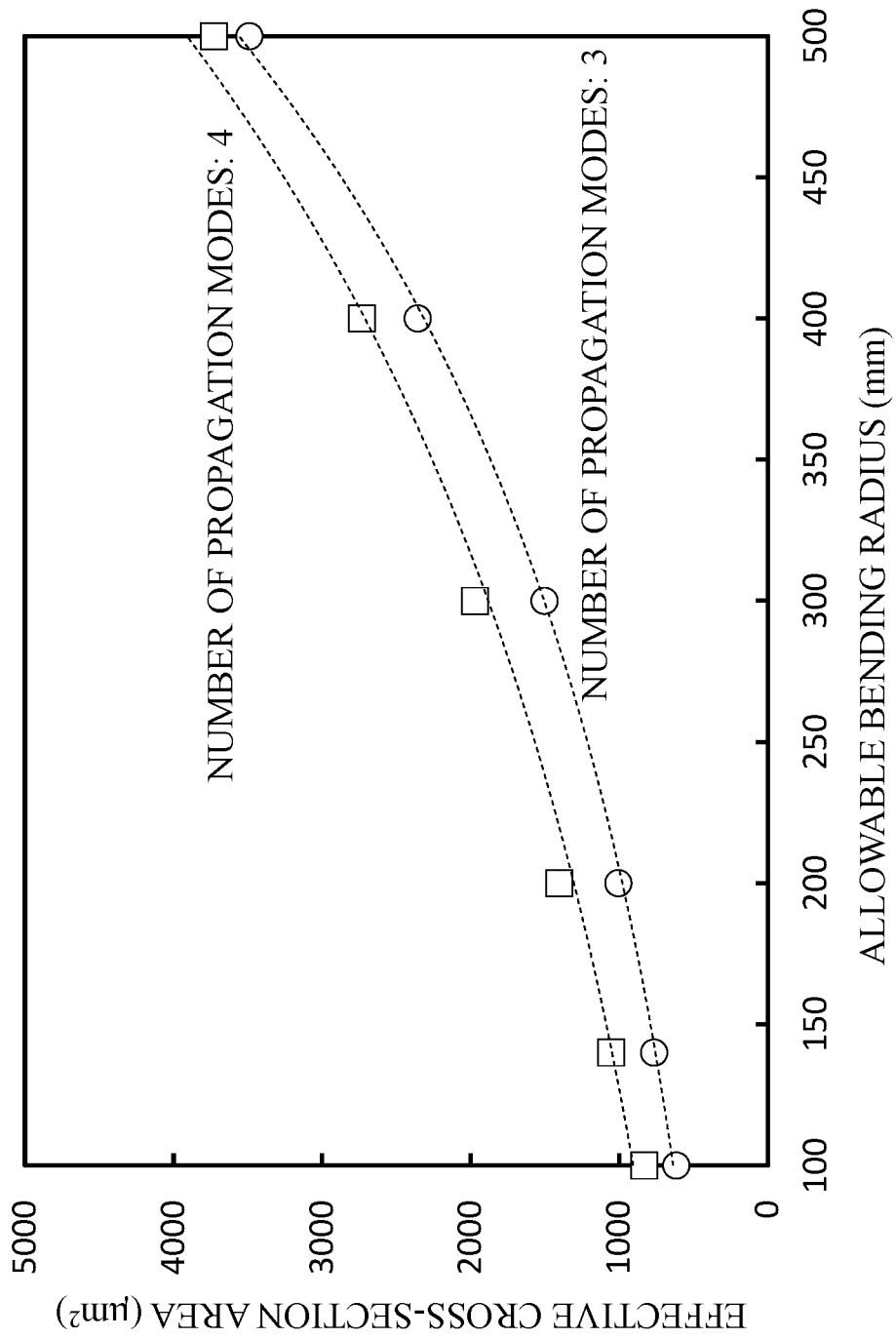
FIG. 21 is a characteristic diagram representing the relationship between the allowable bending radius and the effective cross-sectional area in the photonic crystal fiber according to the present invention.
Figure 22:
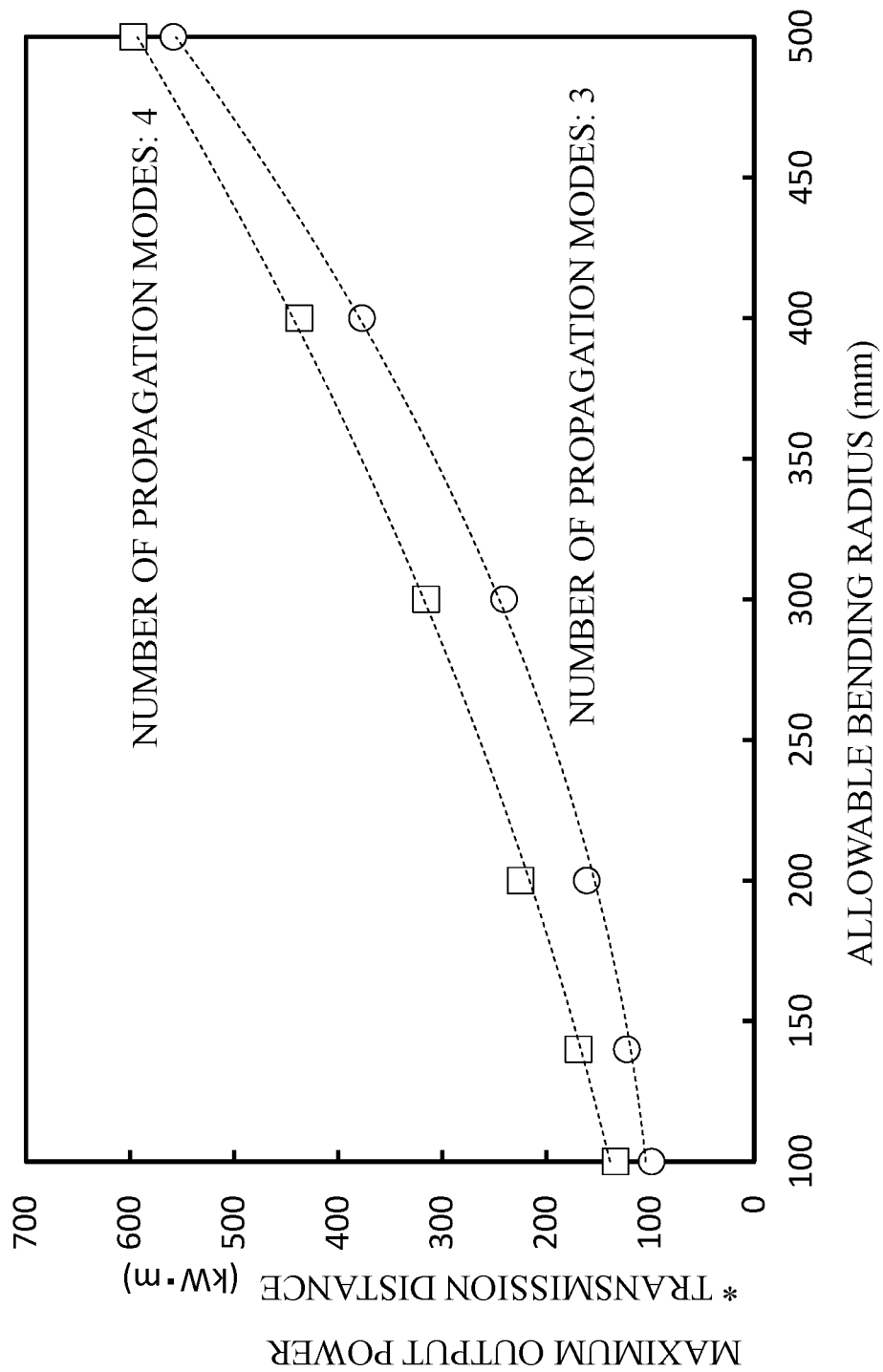
FIG. 22 is a characteristic diagram illustrating the relationship between an allowable bending radius and the maximum output power in the photonic crystal fiber according to the present invention.

FIG. 21 illustrates the relationship between the allowable bending radius and the effective cross-sectional area of the high-power optical transmission optical fiber of the present invention. Here, like the above, the allowable bending radius is a bending radius at which the bending loss is 1 dB/km or less with light having a wavelength of 1.06 μm propagated in the LP01 mode. Moreover, FIG. 22 illustrates the relationship between the allowable bending radius and the maximum output light power standardized by the transmission distance of the high-power optical transmission optical fiber of the present invention. Plots of "circle" and "quadrangle" in the figure represent the case of three propagation modes and the case of four propagation modes propagated in the structure of FIG. 16, respectively, which are values of intersections of the solid line and the broken line in FIG. 17.

FIGS. 21 and 22 illustrate the effective cross-sectional area and the maximum output power, respectively, in the structures at the intersections of the solid line and the broken line in FIG. 17. Also in these structures, by reducing the allowable bending radius to 500 mm, the effective cross-sectional area can be enlarged up to 3500 pmt, and the maximum output power can be increased to 10 kW or more with a transmission distance of 50 m, for example. Furthermore, by allowing the number of propagation modes up to be 4, it is possible to increase the maximum effective cross-sectional area and the maximum output power by about 10%. Since the LP02 mode can be propagated at this time, it is preferable that the diameter of an incident light beam is 0.5 or more relative to an MFD of the optical fiber in order to prevent deterioration of M2.

Third Embodiment

Figure 23:
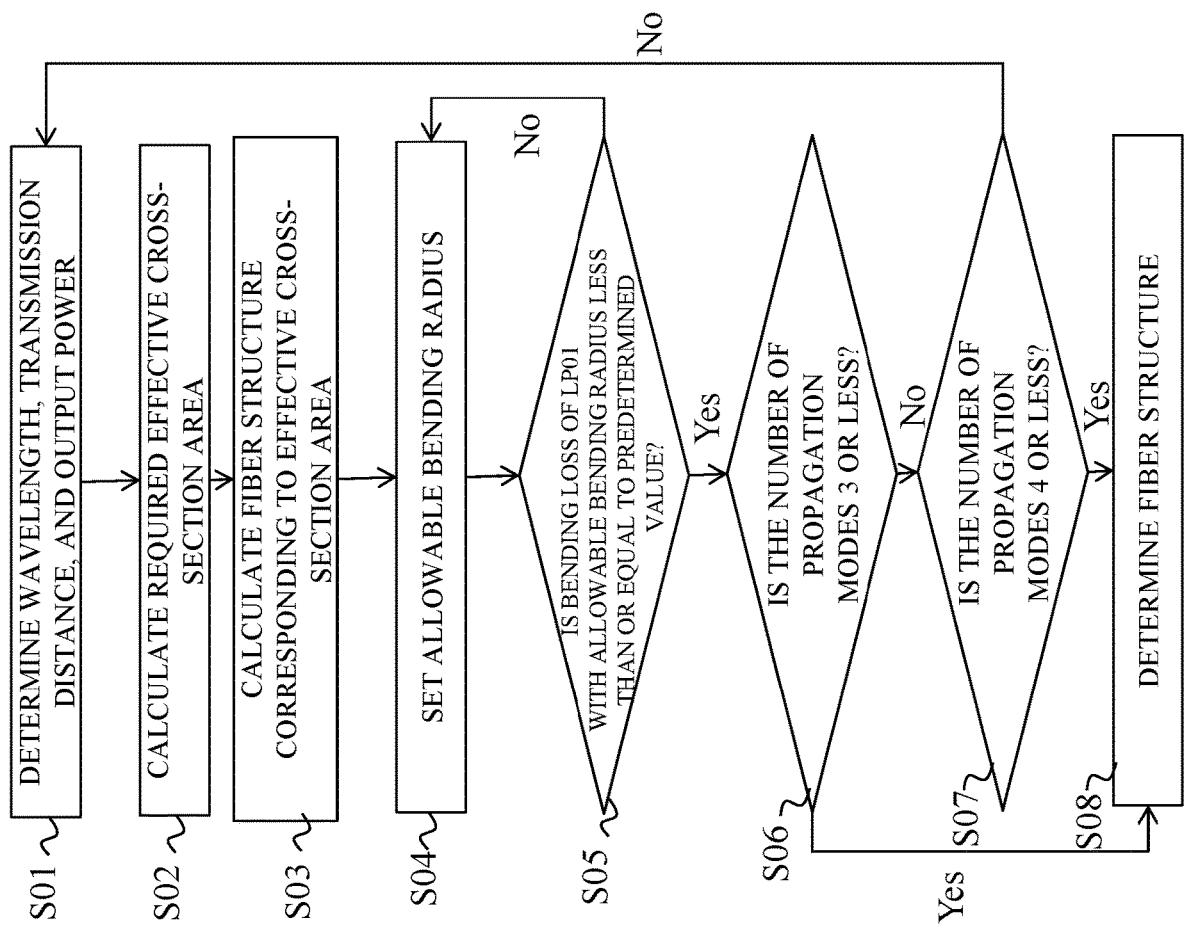
FIG. 23 is a flowchart for explaining an optical fiber design method according to the present invention.

FIG. 23 is a flowchart illustrating an example of a design procedure of the high-power optical transmission optical fiber of the present invention. Performed in a photonic crystal fiber design method of the present embodiment is:

a specification value determining step of determining a wavelength of light propagated in the photonic crystal fiber, power $P_{th}$ of the light propagated in the photonic crystal fiber, and a propagation distance L through which the light is propagated in the photonic crystal fiber;

an effective cross-sectional area calculating step of calculating a required effective cross-sectional area $A_{eff}$ of the photonic crystal fiber by utilizing a mathematical formula C5 on the basis of the power $P_{th}$ and the propagation distance L having been determined in the specification value determining step and a Raman gain coefficient $g_R$;

a hole structure detecting step of calculating an effective cross-sectional area $A_{eff}$ from a diameter d and an interval $\Lambda$ of the holes of the photonic crystal fiber, and detecting the diameter d and the interval $\Lambda$ of the holes of the $A_{eff}$ satisfying or exceeding the required $A_{eff}$ having been calculated in the effective cross-sectional area calculating step on the basis of a plotted graph having a horizontal axis of $d/\Lambda$ and a vertical axis of $\Lambda$;

a bending radius determining step of determining a region of allowable bending radius with which a basic mode can be propagated in the photonic crystal fiber;

a region detecting step of detecting an overlapping region in which a non-propagating region in which the LP02 mode or the LP31 mode is not propagated, a region of the allowable bending radius having been determined in the bending radius determining step, and a region based on a product of power of light from a laser oscillator and the propagation distance L overlap in a graph representing the interval $\Lambda$ of the holes on a horizontal axis and a ratio (d1/d) of a diameter d1 of the holes on the central side and the diameter d of holes adjacent to the holes in the central side from the outer side thereof on a vertical axis or in a graph representing the interval $\Lambda$ of the holes adjacent to the holes in the central side from the outer side thereof on a horizontal axis and a ratio $(d/\Lambda)$ of the diameter d and the interval $\Lambda$ of the holes on a vertical axis; and a structure determining step of determining the interval $\Lambda$ and the ratio (d1/d) or the interval $\Lambda$ and the ratio $(d/\Lambda)$ in the overlapping region as a structure of the photonic crystal fiber.

In a specification value determining step S01, the wavelength, the transmission distance, and the output power $P_{th}$ are set as parameters. In an effective cross-sectional area calculating step S02, an effective cross-sectional area is calculated by the mathematical formula (C5) on the basis of the specifications having been set. Note that theoretically, L in the mathematical formula (C5) can be replaced by the interaction length defined by $Leff=(1-\exp(\alpha L))/\alpha$; however, since it is assumed that the optical fiber of the present invention has a relatively short transmission distance such as 1 km or less, and Leff and L are equivalent values, the transmission distance L is used. Note that the transmission distance is not limited to 1 km or less and can be similarly applied as long as Leff and L can be regarded as equivalent.

In a hole structure detecting step S03, a hole structure giving the calculated effective cross-sectional area is detected. Specifically, a structure such as that of FIG. 2, FIG. 3, or FIG. 16 is determined, and the effective cross-sectional area Aeff is previously calculated using $\Lambda$ and d as parameters and plotted as illustrated in FIG. 8. Then, using FIG. 8, ranges of $\Lambda$ and d satisfying the effective cross-sectional area Aeff having been calculated in the effective cross-sectional area calculating step S02 is found. In a bending radius determining step S04, a desired allowable bending radius is set.

In a region detecting step, steps from S05 to S07 are performed.

In step S05, the bending loss in the LP01 mode at the allowable bending radius having been set in the bending radius determining step S04 in the PCF having the hole structure detected in the hole structure detecting step S03 is calculated (for example, the bending loss in the LP01 mode is in the range of 1 dB/km or less, and a left side region of a broken curve in FIG. 8, FIG. 11, or FIG. 17 is determined). Here, a region satisfying a product of the output power the distance explained in FIG. 9 or FIG. 12 is also set. Furthermore, it is confirmed that the hole structure detected in the hole structure detecting step S03 is included in the overlapping portion of the regions. If the hole structure is included in the overlapping portion of the regions ("Yes" in step S05), step S06 is performed. Note that if the hole structure is not included in the overlapping portion of the regions ("No" in step S05), the flow returns to the bending radius determining step S04 to set a large allowable bending radius, and the design flow is advanced. Note that, in this step, in order to determine whether the bending loss at the allowable bending radius is appropriate, the relationship between the effective cross-sectional area and the bending radius expressed by the mathematical formula (1) can be used. That is, if the set allowable bending radius and the effective cross-sectional area satisfy the mathematical formula (1), the flow is advanced, and if not satisfying the mathematical formula (1), the process returns to step S04 to set a large allowable bending radius.

If the hole structure is included in the region in which the condition of the number of propagation modes is 3 or less, that is, the region under the solid line of the LP02 mode non-propagation condition in FIG. 8, 11, or 17 (for example, a loss of 0.1 dB/m or more) ("Yes" in step S06), the hole structure is employed (step S08). If a structure having three or less modes cannot be obtained ("No" in step S06), if the hole structure is included in the region in which the condition of the number of propagation modes is 4 or less, that is, the region under the solid line of the LP31 mode non-propagation condition in FIG. 8, 11, or 17 ("Yes" in step S07), the hole structure is employed (step S08). On the other hand, if the structure does not have four modes or less ("No" in step S07), the flow returns to the specification value determining step S01 to reduce either one or both of the transmission distance and the output power, and the design flow is performed again.

Noted that the three propagation modes refer to the LP01 mode, the LP11 mode, and the LP21 mode, and the four propagation modes refer to the LP01 mode, the LP11 mode, the LP21 mode, and the LP02 mode.

INDUSTRIAL APPLICABILITY

The PCF according to the present invention can be applied to industrial processing using high-power light.

REFERENCE SIGNS LIST

11 Hole
12 Quartz
81 High-power optical transmission system
82 Workpiece
91 PCF
92 Laser oscillator
93 Lens
94 Coupling part

The invention claimed is:

1. A photonic crystal fiber having a plurality of holes arranged in the photonic crystal fiber along a longitudinal direction,
wherein, in a cross section, a hole ratio which is an area of the holes per unit area is larger in a central side than in an outer side in a portion corresponding to a cladding,
a diameter d is the same for all of the holes, and an interval $\Lambda_1$ of the holes in the central side is smaller than an interval $\Lambda$ of the holes in the outer side, and, when $\Lambda$ is represented in a horizontal axis and $d/\Lambda$ is represented in a vertical axis, $\Lambda$ and d are in a region where respective regions represented by mathematical formulas C2 overlap, and
wherein the photonic crystal fiber propagates light of 90 kW·m or more, has an effective cross-sectional area of 500 μm² or more, and has a bending loss of a basic mode of 1 dB/km with a bending radius of 500 mm or less for a wavelength range of 1.05 to 1.07 μm

[Mathematical Formulas C2]

$$d/\Lambda \leq 0.24\Lambda - 2.22 \qquad (\Lambda \leq 10.8\ \mu m) \qquad (C2)$$
$$d/\Lambda \leq 0.00667\Lambda + 0.293 \quad (10.8\ \mu m \leq \Lambda \leq 19.5\ \mu m)$$
$$d/\Lambda \leq 0.01\Lambda + 0.23 \qquad (\Lambda \geq 19.5\ \mu m)$$
$$d/\Lambda \geq 0.3 \qquad (\Lambda \leq 19.2\ \mu m)$$
$$d/\Lambda \geq 0.0195\Lambda - 0.075 \qquad (\Lambda \geq 19.2\ \mu m).$$

2. The photonic crystal fiber according to claim 1, wherein the number of propagation modes is three or less.

3. A photonic crystal fiber having a plurality of holes arranged in the photonic crystal fiber along a longitudinal direction,
wherein, in a cross section, a hole ratio which is an area of the holes per unit area is larger in a central side than in an outer side in a portion corresponding to a cladding,
three or more layers having different hole ratios from each other are arranged concentrically with a layer closer to a center having a larger hole ratio,
a diameter d is the same for all of the holes, and, when an interval $\Lambda$ between a hole in a central layer closest to the center and a hole in an adjacent layer adjacent to the central layer is represented in a horizontal axis and $d/\Lambda$ is represented in a vertical axis, $\Lambda$ and d are in a region where respective regions represented by mathematical formulas C3 overlap, and
wherein the photonic crystal fiber propagates light of 90 kW·m or more, has an effective cross-sectional area of 500 μm² or more, and has a bending loss of a basic mode of 1 dB/km with a bending radius of 500 mm or less for a wavelength range of 1.05 to 1.07 μm

[Mathematical Formulas C3]

$$d/\Lambda \leq 0.22\Lambda - 2.01 \qquad (\Lambda \leq 10.9\ \mu m) \qquad (C3)$$
$$d/\Lambda \leq -0.000769\Lambda + 0.398 \quad (10.9\ \mu m \leq \Lambda \leq 16.1\ \mu m)$$
$$d/\Lambda \leq 0.004\Lambda + 0.32 \qquad (\Lambda \geq 16.1\ \mu m)$$
$$d/\Lambda \geq 0.00172\Lambda + 0.322 \qquad (\Lambda \leq 15.2\ \mu m)$$
$$d/\Lambda \geq 0.0064\Lambda + 0.250 \qquad (\Lambda \geq 15.2\ \mu m).$$

4. The photonic crystal fiber according to claim 3, wherein the number of propagation modes is three or less.

5. A photonic crystal fiber having a plurality of holes arranged in the photonic crystal fiber along a longitudinal direction,
wherein, in a cross section, a hole ratio which is an area of the holes per unit area is larger in a central side than in an outer side in a portion corresponding to a cladding,
three or more layers having different hole ratios from each other are arranged concentrically with a layer closer to a center having a larger hole ratio, a diameter d is the same for all of the holes, and, when an interval $\Lambda$ between a hole in a central layer closest to the center and a hole in an adjacent layer adjacent to the central layer is represented in a horizontal axis and $d/\Lambda$ is represented in a vertical axis, $\Lambda$ and d are in a region where respective regions represented by mathematical formulas C4 overlap, and wherein the photonic crystal fiber propagates light of 90 kW·m or more, has an effective cross-sectional area of 500 μm² or more, and has a bending loss of a basic mode of 1 dB/km with a bending radius of 500 mm or less for a wavelength range of 1.05 to 1.07 μm

[Mathematical Formulas C4]

$$d/\Lambda \leq 0.22\Lambda - 2.01 \quad (\Lambda \leq 11 \ \mu m) \quad (C4)$$
$$d/\Lambda \leq 0.407 \quad (11 \ \mu m \leq \Lambda \leq 18.7 \ \mu m)$$
$$d/\Lambda \leq 0.00333\Lambda + 0.345 \quad (\Lambda \geq 18.7 \ \mu m)$$
$$d/\Lambda \geq 0.00167\Lambda + 0.323 \quad (\Lambda \leq 14.5 \ \mu m)$$
$$d/\Lambda \geq 0.00625\Lambda + 0.255 \quad (\Lambda \geq 14.5 \ \mu m).$$

6. The photonic crystal fiber according to claim 5, wherein the number of propagation modes is four or less.

* * * * *